(12) United States Patent
Takano

(10) Patent No.: US 9,052,847 B2
(45) Date of Patent: Jun. 9, 2015

(54) IMAGE FORMING APPARATUS, INFORMATION PROCESSING SYSTEM, CONTROL METHOD, AND RECORDING MEDIUM IN ACCORDANCE WITH A CONTROL COMMAND FROM A DEVICE DRIVER

(71) Applicant: CANON KABUSHIKI KAISHA, Tokyo (JP)

(72) Inventor: Shinichi Takano, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/921,909

(22) Filed: Jun. 19, 2013

(65) Prior Publication Data

US 2014/0002840 A1   Jan. 2, 2014

(30) Foreign Application Priority Data

Jun. 27, 2012 (JP) ................................. 2012-144547
Jun. 5, 2013 (JP) ................................. 2013-118734

(51) Int. Cl.
*G06F 3/12* (2006.01)
*H04N 1/00* (2006.01)
*H04N 1/44* (2006.01)
*G06F 21/31* (2013.01)
*G06F 21/60* (2013.01)

(52) U.S. Cl.
CPC .......... *G06F 3/1201* (2013.01); *H04N 1/00225* (2013.01); *H04N 1/00941* (2013.01); *H04N 1/4413* (2013.01); *H04N 1/4433* (2013.01); *H04N 2201/0094* (2013.01); *G06F 21/31* (2013.01); *G06F 21/608* (2013.01); *G06F 2221/2117* (2013.01)

(58) Field of Classification Search
USPC .................................................. 358/1.1–3.29
See application file for complete search history.

(56) References Cited

U.S. PATENT DOCUMENTS

| 8,264,706 | B2 | 9/2012 | Sato | 358/1.14 |
| 2008/0018957 | A1* | 1/2008 | Suzuki | 358/474 |
| 2008/0086768 | A1* | 4/2008 | Mirza-Baig | 726/13 |
| 2008/0140250 | A1* | 6/2008 | Dave | 700/237 |
| 2009/0190163 | A1* | 7/2009 | Sato | 358/1.15 |
| 2011/0019216 | A1* | 1/2011 | Kataoka et al. | 358/1.13 |
| 2012/0307300 | A1* | 12/2012 | Takano | 358/1.15 |

FOREIGN PATENT DOCUMENTS

JP   2009-177547 A   8/2009

* cited by examiner

*Primary Examiner* — Marcellus Augustin
(74) *Attorney, Agent, or Firm* — Fitzpatrick, Cella, Harper & Scinto

(57) ABSTRACT

An image forming apparatus receives a scan command from a device driver with which an information processing apparatus is provided, and discriminates whether a control protocol of the scan command can utilize an authentication function when the authentication function is enabled in the image forming apparatus. When it is discriminated that the control protocol of the scan command cannot utilize the authentication function, the image forming apparatus displays an authentication information input screen, conducts authentication processing using authentication information that was input according to manipulation of the input screen, and executes scan processing of an image in accordance with the scan command when authentication is successful.

14 Claims, 17 Drawing Sheets

| Device ID | User ID | Password |
|---|---|---|
| abcdefgh123456789 | 112233 | aaabbb111 |
| 012345678ijklmnop | 445566 | dddeee222 |
| 5Q9r0s1t2u3v4w5x6 | 778899 | ggghhh333 |
| yzabcdef890123456 | 001122 | jjjkkk444 |

IMAGE FORMING APPARATUS, INFORMATION PROCESSING SYSTEM, CONTROL METHOD, AND RECORDING MEDIUM IN ACCORDANCE WITH A CONTROL COMMAND FROM A DEVICE DRIVER

BACKGROUND OF THE INVENTION

1. Field of the Invention

The present invention relates to an image forming apparatus, an information processing system, a control method, and a recording medium.

2. Description of the Related Art

To utilize peripheral equipment of an image forming apparatus and the like from an information processing apparatus, it is generally necessary to load device drivers compatible with control commands unique to the peripheral devices into a processing system (hereinafter "OS") that operates on the information processing apparatus. For example, in the case where the peripheral device is an image forming apparatus provided with a scanner, it is necessary to load a scanner driver into the OS.

In the case where the aforementioned image forming apparatus is utilized from an information processing apparatus, the scanner driver is activated from an application, settings required for scanning are established, the image forming apparatus is controlled with control commands unique to the image forming apparatus, and acquired image data is transferred to the application. By this means, the application can freely handle image data.

With respect to image forming apparatuses, there are cases where an authentication function unique to the image forming apparatus is enabled. An authentication function unique to an image forming apparatus is a function which requests input of authentication information when functions of the image forming apparatus are to be used, and which permits use of functions of the image forming apparatus only in the case where authentication is successful. Authentication processing is conducted using user information and a password controlled by a manager of the image forming apparatus. In the case where an authentication function unique to an image forming apparatus is enabled, a request is issued to a device driver to transmit authentication information (an authentication request is issued) upon receipt of a control command of a scan request from the device driver. Upon receiving the authentication request, the device driver transmits authentication information by a control command unique to the image forming apparatus. The image forming apparatus conducts authentication processing using the received authentication information. When authentication is successful, the image forming apparatus performs scanning according to the control command. In image forming apparatuses in which an authentication function is enabled, scan requests from an information processing apparatus that cannot be authenticated are not executed.

Japanese Patent Application Laid-Open No. 2009-177547 discloses an image reading apparatus which discriminates whether or not to perform reading based on a result of comparison of authentication information stored in a memory unit and authentication information transmitted from a transmission source of a reading execution instruction.

Among device drivers, there also exist drivers (general-purpose drivers) which do not use control commands that are unique to an image forming apparatus, but which use general-purpose control commands that are not dependent on an image forming apparatus. General-purpose drivers are in many cases pre-loaded into an OS. For example, a driver (WSD scan driver) compatible with the WSD (Web Service on Devices) scan protocol is loaded into the Windows® OS. A WSD scan driver conducts scanning by controlling the image forming apparatus using the WSD scan protocol. In such cases, if the image forming apparatus is compatible with the WSD scan protocol, scanning is possible even without loading a device driver unique to the image forming apparatus into the OS.

However, if scanning is conducted by controlling an image forming apparatus using a general-purpose driver of an information processing apparatus, there are cases where a general-purpose control command does not include an authentication function. Moreover, even if a general-purpose control command includes an authentication function, there are cases where it is not compatible with an authentication function unique to the image forming apparatus, and where it cannot conduct authentication processing with the image forming apparatus. In such cases, scanning cannot be conducted when an authentication function is enabled in the image forming apparatus.

SUMMARY OF THE INVENTION

An image forming apparatus of the present invention can perform authentication processing even in cases where a device driver of an information processing apparatus is not compatible with an authentication function unique to the image forming apparatus, and performs scan processing of an image in response to an authentication result.

An image forming apparatus of one embodiment of the present invention is an image forming apparatus which executes image formation processing in accordance with a control command transmitted from a device driver with which an information processing apparatus is provided. The aforementioned image forming apparatus is provided with a receiving unit which receives a scan command from the aforementioned device driver, a first discrimination unit which discriminates whether a control protocol of the scan command can utilize an authentication function when the authentication function is enabled in the image forming apparatus, a display unit which displays an authentication information input screen when it is discriminated that the control protocol of the scan command cannot utilize the aforementioned authentication function, and an execution unit which conducts authentication processing using authentication information that is input according to manipulation of the input screen, and which executes scan processing of an image according to the scan command when authentication is successful.

Further features of the present invention will become apparent from the following description of exemplary embodiments with reference to the attached drawings.

DESCRIPTION OF THE EMBODIMENTS

First Embodiment

Figure 1:
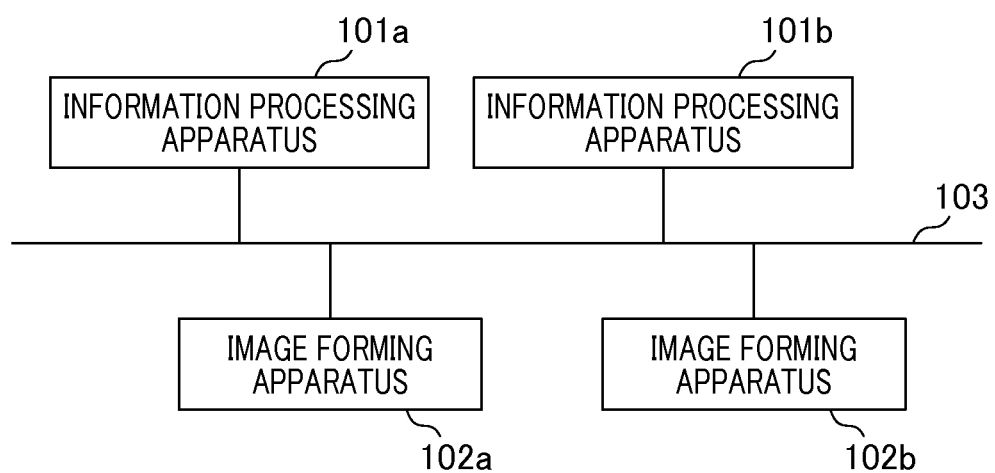
FIG. 1 is a drawing which illustrates an exemplary system configuration of a first embodiment.

FIG. 1 is a drawing which illustrates an exemplary system configuration of a first embodiment. FIG. 1 shows an information processing system of the present embodiment. This information processing system is provided with information processing apparatuses 101a and 101b and image forming apparatuses 102a and 102b. In the following description, the information processing apparatuses 101a and 101b are sometimes denoted simply as the information processing apparatus 101, and the image forming apparatuses 102a and 102b are sometimes denoted simply as the image forming apparatus 102. The information processing apparatus 101 and the image forming apparatus 102 are connected via a local network 103 such as an Ethernet®. The image forming apparatus 102 performs image formation processing according to a control command transmitted from a device driver with which the information processing apparatus 101 is provided. Specifically, the image forming apparatus 102 conducts scan processing to acquire image data, and transmits this image data to the information processing apparatus 101.

Figure 2:
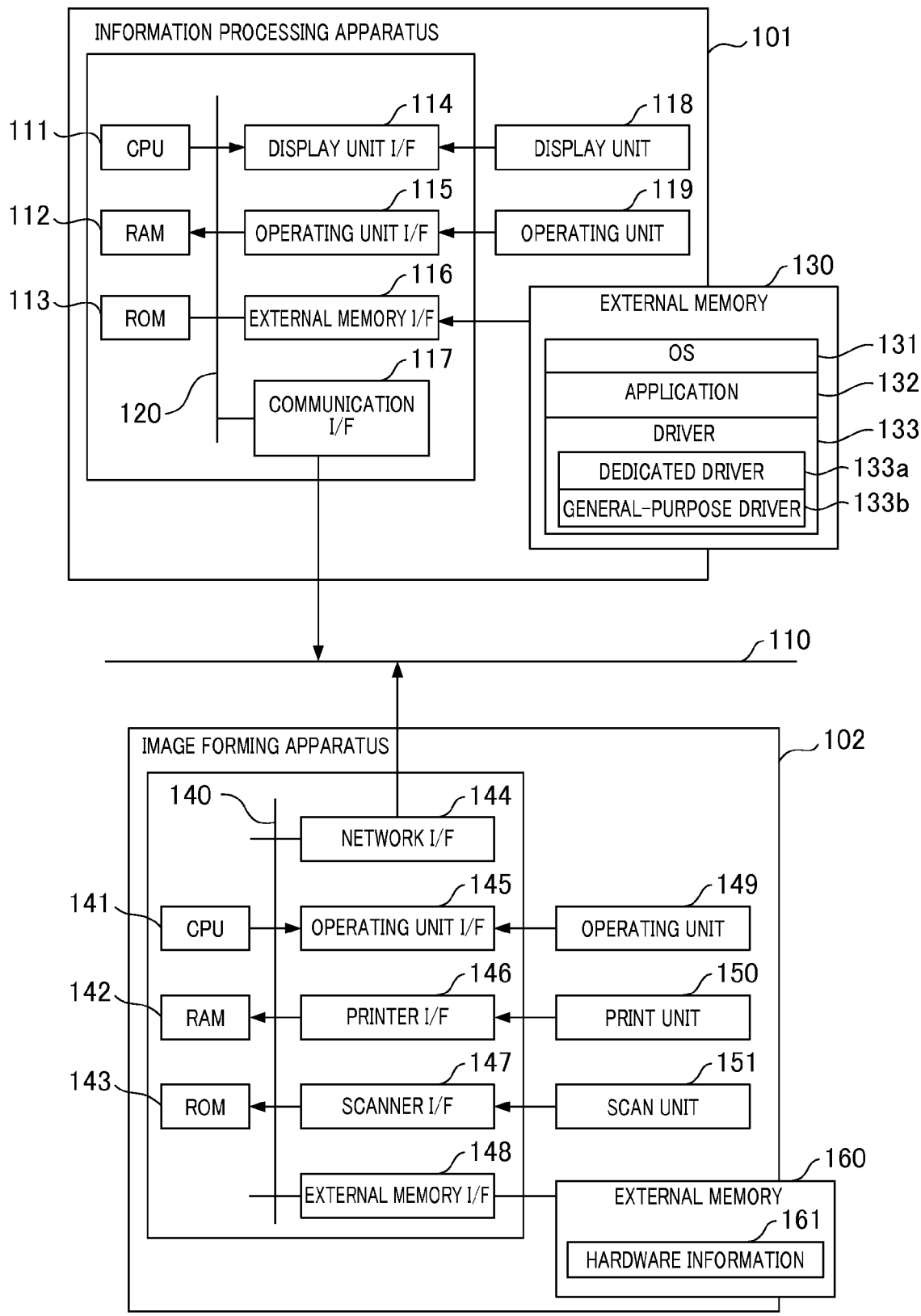
FIG. 2 is a drawing which illustrates exemplary device configurations of an information processing apparatus and an image forming apparatus.

FIG. 2 is a drawing which illustrates exemplary device configurations of an information processing apparatus and an image forming apparatus. In the information processing apparatus 101, a CPU 111 conducts overall control of the various devices connected to a system bus 120 according to a program stored in a RAM 112. CPU is an abbreviation for Central Processing Unit. RAM is an abbreviation for Random Access Memory.

The RAM 112 is the main memory of the CPU 111, and also functions as a work area or the like. A ROM 113 stores various programs and data in advance. ROM is an abbreviation for Read Only Memory. An operating unit I/F 115 controls key inputs from an operating unit 119 or a pointing device (such as a touch panel) that is not illustrated in the drawings. A display unit I/F 114 controls the display of a display unit 118.

An external memory I/F 116 controls access to an external memory 130 such as an SSD or a flash memory. SSD is an abbreviation for "solid-state disk". The external memory 130 stores various types of applications 132 beginning with an OS 131, as well as driver software (drivers) 133. OS is an abbreviation for "operating system". The external memory 130 functions as a recording medium in which the information processing apparatus 101 can conduct saving or reading.

The driver 133 may be prepared in the OS 131 in advance, or it may be separately installed in the OS 131 by downloading it from an external server or media such as a CD-ROM.

There are two types of driver 133. One is a dedicated driver 133a which communicates by a control protocol that is unique to the image forming apparatus 102 that is the connection target. It is possible to conduct a unique control between the image forming apparatus 102 and the dedicated driver 133a.

The other one is a general-purpose driver 133b which communicates by a general-purpose control protocol that is not dependent on the image forming apparatus 102. The image forming apparatus 102 and the general-purpose driver 133b can only communicate by a control protocol that is determined for general use. Accordingly, it is not possible to conduct a unique control between the image forming apparatus 102 and the general-purpose driver 133b.

A general-purpose driver is, for example, a driver (WSD scan driver) which is compatible with the WSD (Web Service on Devices) scan protocol. A WSD scan driver is loaded into a Windows OS, and conducts control and scanning with respect to the image forming apparatus 102 using the WSD scan protocol. If the image forming apparatus 102 is compatible with the WSD scan protocol, scanning can be conducted without loading a device driver unique to the image forming apparatus 102 into the OS 131. A communication I/F 117 is a network control unit, and enables connection to a local network 110 through a network terminal. Although omitted from the drawings, the information processing apparatus 101 may be provided with a control unit for wireless networks such as Wi-Fi or a mobile network. In the case where the information processing apparatus 101 is provided with a control unit for wireless networks, the pertinent control unit may conduct connection through an antenna or network terminal that is not illustrated in the drawings.

Next, a description is given of the configuration of the image forming apparatus 102. A CPU 141 controls the overall operations of the image forming apparatus 102. The CPU 141 acquires image data from a scan unit 151 via a scanner I/F 147 based on a control program or the like stored in a ROM 143. The CPU 141 also communicates with the information processing apparatus 101 via a network I/F 144. Specifically, the CPU 141 transmits image data to the information processing apparatus 101, and notifies the information processing apparatus 101 of information and the like of the image forming apparatus 102.

A RAM 142 is the main memory of the CPU 141; it functions as a work area or the like, and may also be used as an input information development region and an environmental data storage region. The RAM 142 is also provided with an NVRAM (non-volatile RAM) region, and is configured so that memory capacity can be expanded by an optional RAM that is connected to an add-on port (not illustrated in the drawings). The ROM 143 stores various types of fonts, control programs and the like to be executed by the CPU 141, and various types of data.

The network I/F 144 conducts receipt and transmission of data vis-à-vis the information processing apparatus 101. A printer I/F 146 is an interface with a print unit 150 that is a printer engine. A scanner I/F 147 controls interface with the scan unit 151 that is a scanner engine.

Access by an external memory 160 is controlled by an external memory I/F 148. The external memory 160 includes a flash memory, an SSD, or the like, and can also store hardware information 161. Note that, in the case where an external memory 160 such as a hard disk is not connected, information and the like that is utilized by the information processing apparatus 101 is stored in the ROM 143.

An operating unit I/F 145 controls interface with an operating unit 149 that establishes settings for and conducts operation of the image forming apparatus 102. The operating unit 149 is provided with a control panel that accepts manipulations by the user. Switches, LED displays, and the like for operation are arranged in the control panel. The operating unit 149 may also be configured with an NVRAM (not illustrated in the drawings) to store scan setting information that is input from the control panel. A control method of the present embodiment is implemented by the functions of various processing units with which the image forming apparatus 102 shown in FIG. 1 is provided, and a computer program of the present embodiment runs this control method on the computer. The image forming apparatus of the present embodiment is configured with a print unit and a scan unit, but is not limited thereto. With respect to the image forming apparatus, a variety of apparatuses may be applied provided that the apparatus is provided with at least a scan unit.

Figure 3:
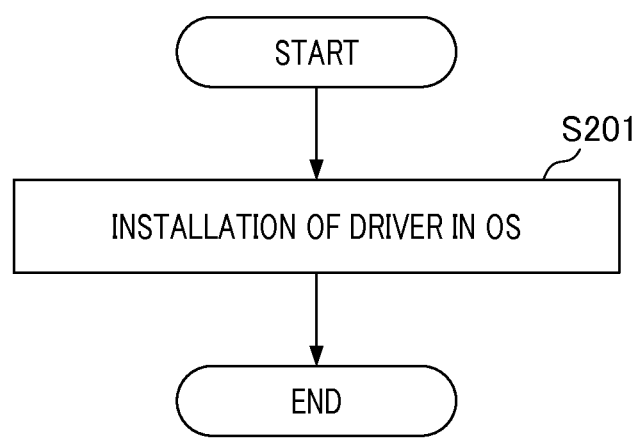
FIG. 3 is a drawing which explains an example of driver installation processing in an information processing apparatus.

FIG. 3 is a flowchart which describes an example of driver installation processing in the information processing apparatus. In FIG. 3, installation processing of the driver 133 in the OS 131 of the information processing apparatus 101 is exemplified for description.

In the case where the object of installation is the dedicated driver 133a for the image forming apparatus 102, the information processing apparatus 101 downloads the dedicated driver 133a from an external server or from media such as a CD-ROM according to user operation. The information processing apparatus 101 then installs the dedicated driver 133a that has been downloaded (step S201). The user may also conduct installation that designates a dedicated driver 133a that has been prepared in advance in the OS 131.

The general-purpose driver 133b is a driver that is not dependent on the image forming apparatus 102. Accordingly, there may be cases where the general-purpose driver 133b is pre-installed in the OS 131. In such cases, the installation operation of the aforementioned step S201 is unnecessary. However, in cases where the general-purpose driver 133b that is the object of installation is not installed in the OS 131, the installation operation of step S201 is necessary.

Preparations for use of the driver 133 by the information processing apparatus 101 are completed by the installation processing of the aforementioned step S201. In step S201, the information processing apparatus 101 may also transmit identification information or address information of the information processing apparatus 101 to the image forming apparatus 102, and the information processing apparatus 101 may be registered in the image forming apparatus 102 as a transmission counterpart for scan execution instructions. By this means, it is possible to issue scan execution instructions from the image forming apparatus 102 to the information processing apparatus 101 in the below-described step S301 of FIG. 6.

Figure 4:
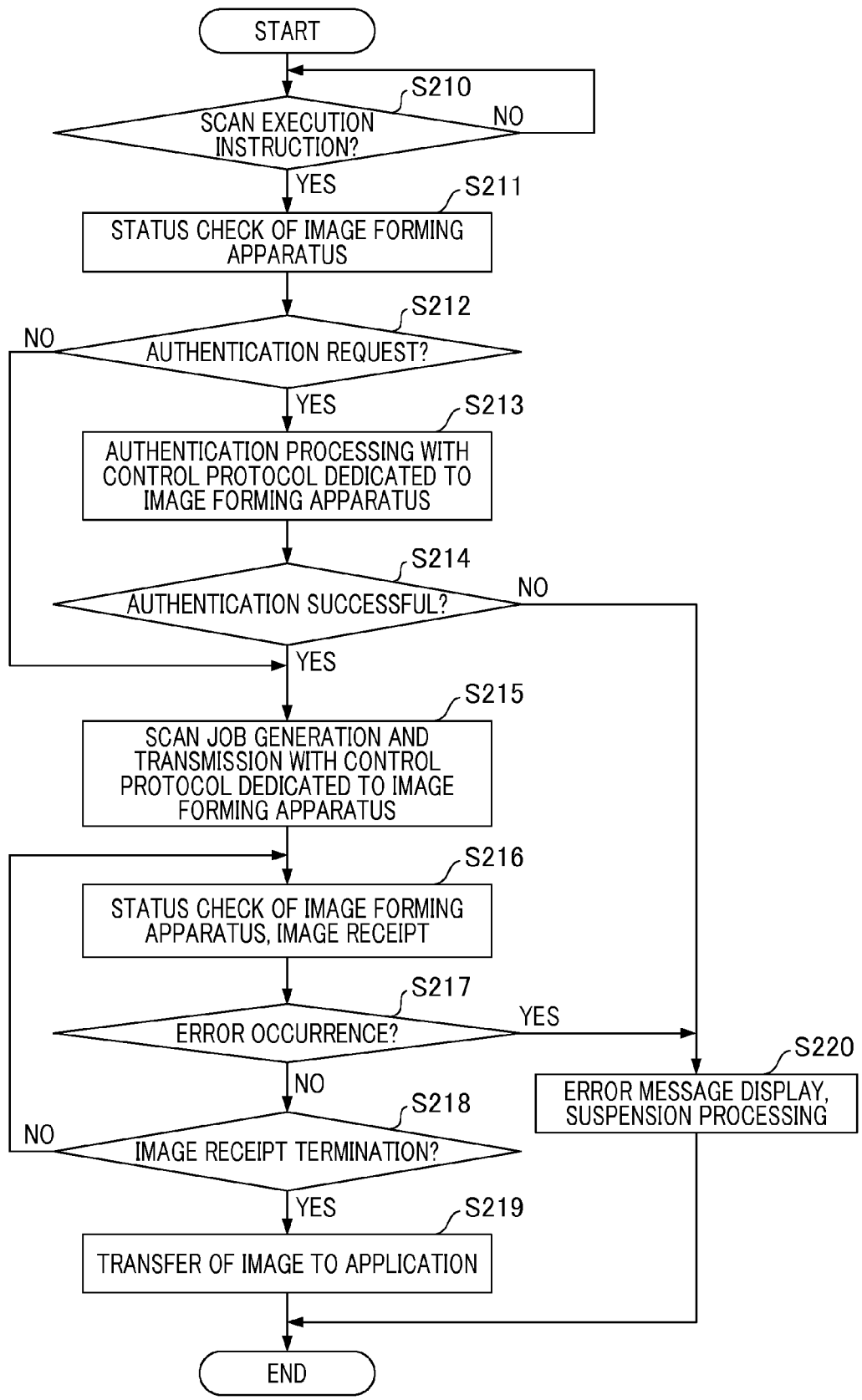
FIG. 4 is a drawing which explains an example of scan execution processing of a dedicated driver.

FIG. 4 is an example of scan execution processing of a dedicated driver. First, the dedicated driver 133a discriminates whether a scan execution instruction has been issued (step S210). A scan execution instruction is issued by activating the dedicated driver 133a from an application 132 by user manipulation of the operating unit 119. A scan execution instruction may also be issued by activation of the dedicated driver 133a that is triggered by a scan request event transmitted from the image forming apparatus 102 by means of a mechanism that activates the application 132 in response to a detected event of the OS 131.

In the case where there is no scan execution instruction, a return to step S210 occurs. In the case where there is a scan execution instruction, the dedicated driver 133a communicates with the image forming apparatus 102 using the dedicated control protocol of the image forming apparatus 102, and checks the status of the image forming apparatus 102 (step S211). In the case where the image forming apparatus 102 is in an abnormal state, error termination occurs.

Next, the dedicated driver 133a discriminates whether an authentication request has been received from the image forming apparatus 102 (step S212). In the case where an authentication function is enabled in the image forming apparatus 102, an authentication request is transmitted from the image forming apparatus 102. An authentication function is a function which requests authentication using user information (user ID, password, etc.) managed in the image forming apparatus 102 when the image forming apparatus 102 is to be used. The purpose of an authentication function is to improve the security of the image forming apparatus 102, and manage information that is tied to user information such as usage history. User information and settings that validate or invalidate the authentication function are set in the image forming apparatus 102 by a manager. In the case where an authentication request is not received from the image forming apparatus 102, the processing advances to step S215. In the case where an authentication request is received from the image forming apparatus 102, the processing advances to step S213.

Next, the dedicated driver 133a conducts authentication processing using a dedicated control protocol of the image forming apparatus 102 (step S213). This authentication processing is conducted by having the information processing apparatus 101 transmit the authentication information (user ID, password, etc.) set by the user to the image forming apparatus 102. The information processing apparatus 101 may also input authentication information according to user manipulation of the operating unit 121. Or the authentication information may be preset in the information processing apparatus 101.

In the example shown in FIG. 4, the authentication processing of the aforementioned step S213 is possible, because the driver is the dedicated driver 133a, and can be controlled with a dedicated control protocol of the image forming apparatus 102.

Next, the dedicated driver 133a discriminates whether authentication has been successful (step S214). In the case where authentication has been successful, the processing advances to step S215. In the case where authentication has failed, the information processing apparatus 101 displays an error message, and suspends scan processing (step S220). An error message is a message which provides notification that authentication failed.

In step S215, the dedicated driver 133a generates a scan job with the dedicated control protocol of the image forming apparatus 102, and transmits it to the image forming apparatus 102. Subsequently, the dedicated driver 133a checks the status of the image forming apparatus 102, and requests receipt (acquisition) of the image data (step S216).

Next, the dedicated driver 133a discriminates whether an error has occurred in the image forming apparatus 102 based on the results of status confirmation processing of the image forming apparatus 102 in the aforementioned step S216 (step S217). In the case where an error has occurred in the image forming apparatus 102, the processing advances to step S220. In the case where an error has not occurred in the image forming apparatus 102, the processing advances to step S218.

In step S218, the dedicated driver 133a discriminates whether reception of image data is completed. In the case where reception of image data is not completed, the processing returns to step S216. In the case where reception of image data is completed, the dedicated driver 133a transfers the image data that has been completely received to the application 132 (step S219). The transferred image data is subjected to image processing according to the settings of the dedicated driver 133a.

Figure 5:
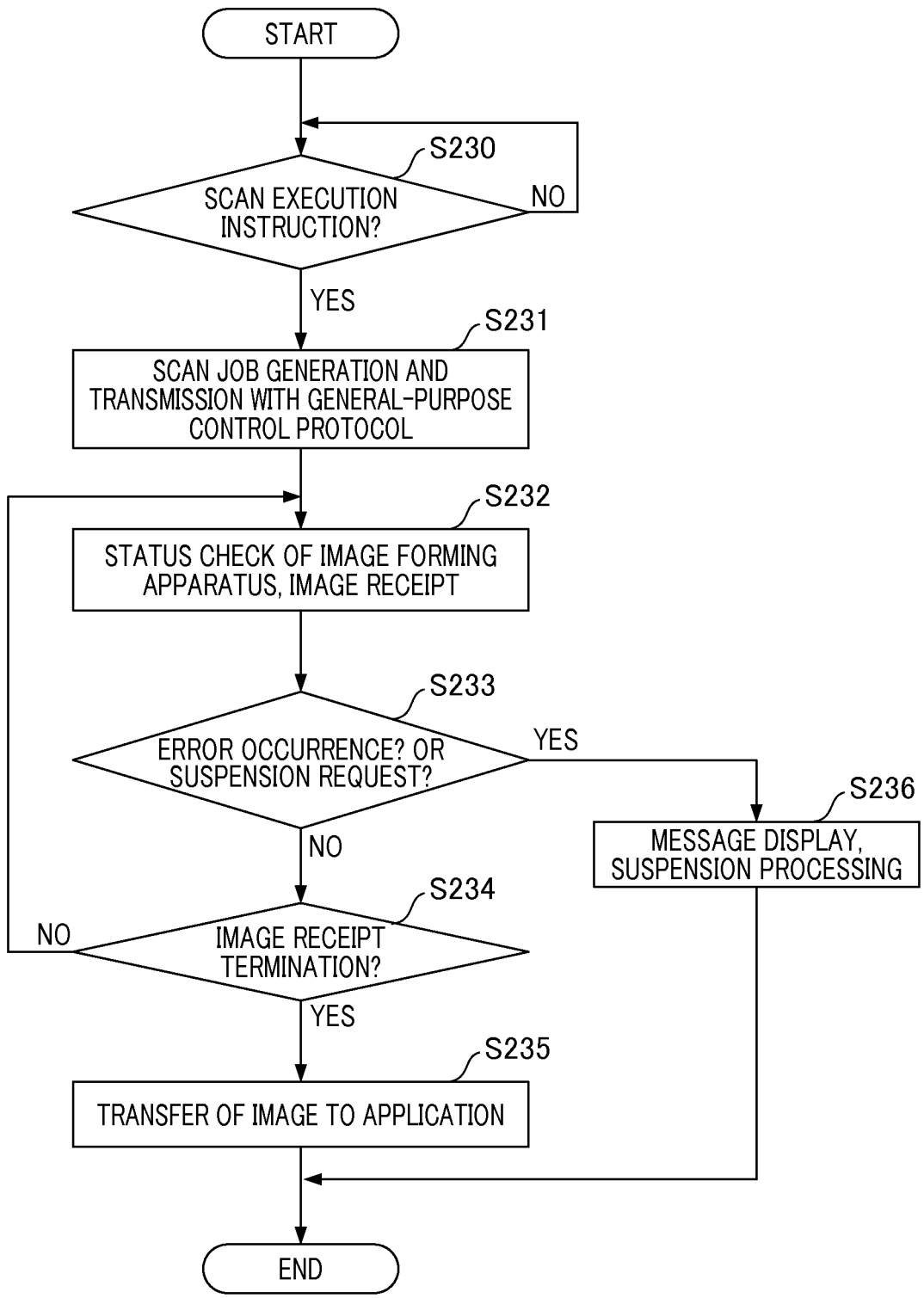
FIG. 5 is a drawing which explains an example of scan execution processing of a general-purpose driver.

FIG. 5 is a flowchart which describes an example of scan execution processing of a general-purpose driver. The general-purpose driver 133b in the OS 131 of the information processing apparatus 101 conducts the scan execution processing described below.

First, the general-purpose driver 133b discriminates whether a scan execution instruction has been received (step S230). A scan execution instruction is issued, for example, in the following manner. A scan execution instruction is issued by activating the general-purpose driver 133b from the application 132 by user manipulation of the operating unit 119. A scan execution instruction may also be issued by activation of the general-purpose driver 133b from the application 132 that is triggered by receipt of a scan request event from the image forming apparatus 102. Consequently, the information processing apparatus 101 has a mechanism which activates the application 132 in response to an event detected by the OS 131.

In the case where the general-purpose driver 133b discriminates that a scan execution instruction has not been received, the processing returns to step S230. In the case where the general-purpose driver 133b discriminates that a scan execution instruction has been received, the processing advances to step S231.

In step S231, the general-purpose driver 133b generates a scan job with a general-purpose control protocol, and transmits the generated scan job to the image forming apparatus 102 (step S231). Subsequently, the general-purpose driver 133b checks the status of the image forming apparatus 102 by the general-purpose control protocol, and requests receipt of image data (step S232).

Next, based on the result of status confirmation in step S232, the general-purpose driver 133b discriminates whether an error has occurred in the image forming apparatus 102 or whether suspension of processing has been requested by the user (step S233). In the case where an error has occurred in the image forming apparatus 102 or where suspension of processing has been requested by the user, the processing advances to step S236. The general-purpose driver 133b then displays a message which indicates that image data cannot be acquired, and scan execution processing is suspended (step S236).

With respect to the image forming apparatus 102, in the case where an authentication function unique to the image forming apparatus 102 is enabled, authentication processing unique to the image forming apparatus 102 cannot be conducted with a general-purpose control protocol. Therefore, in this case, an error is returned from the image forming apparatus 102 in the aforementioned step S232, and the general-purpose driver 133b discriminates that an error has occurred in the image forming apparatus 102 ("Yes" in S233).

In the case where an error has not occurred in the image forming apparatus 102, and where suspension of processing has also not been requested by the user, the processing advances to step S234. The general-purpose driver 133b then discriminates whether receipt of image data from the image forming apparatus 102 is completed (step S234). In the case where receipt of image data from the image forming apparatus 102 is not completed, the processing returns to step S232. In the case where receipt of image data from the image forming apparatus 102 is completed, the processing advances to step S235.

In step S235, the general-purpose driver 133b subjects the image data received from the image forming apparatus 102 to the image processing that is set in the general-purpose driver 133b, and transfers it to the application 132.

Figure 6B:
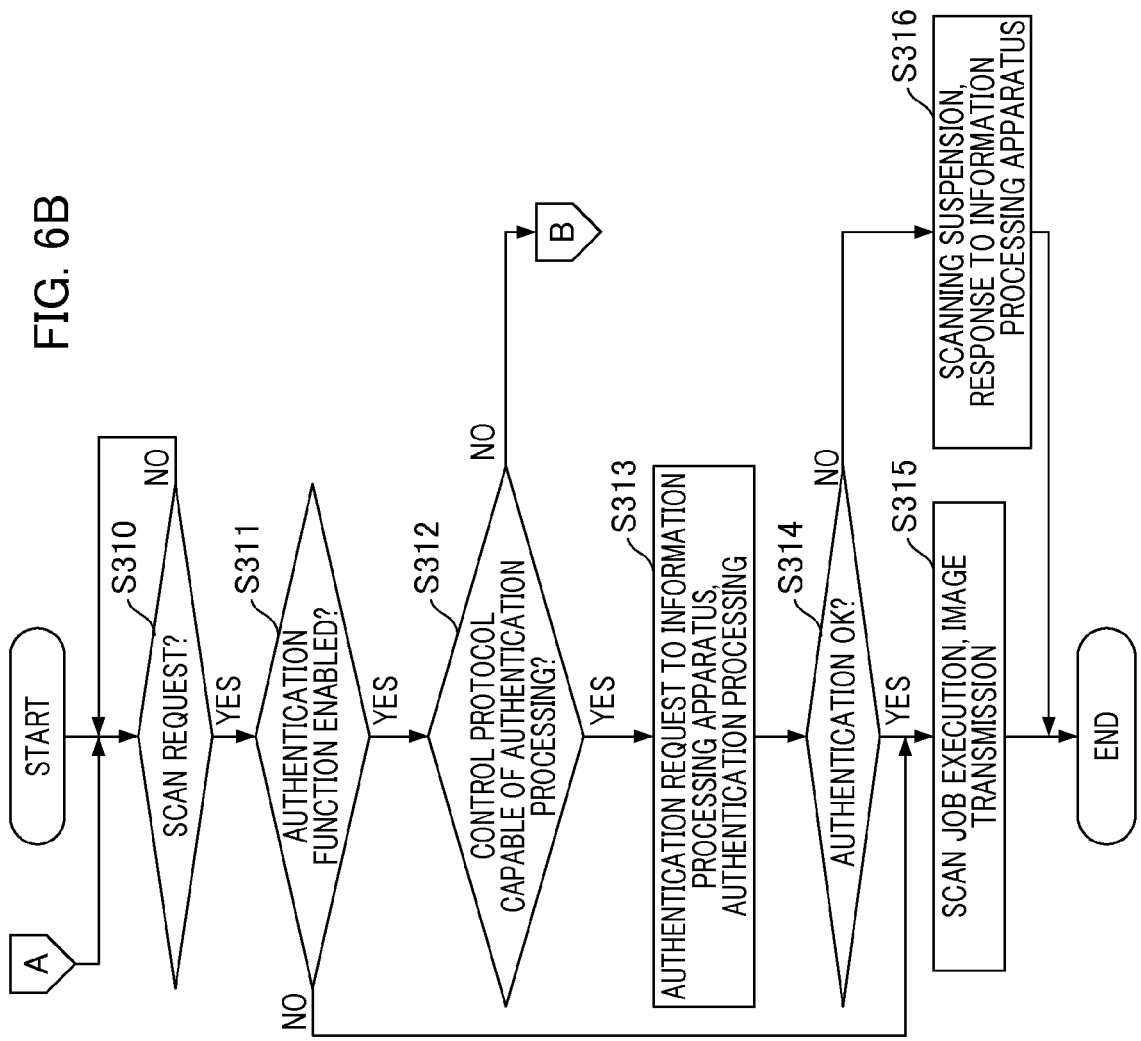
FIG. 6A and FIG. 6B are drawings which explain examples of scan execution instruction processing and scan execution processing by an image forming apparatus.
Figure 6A:
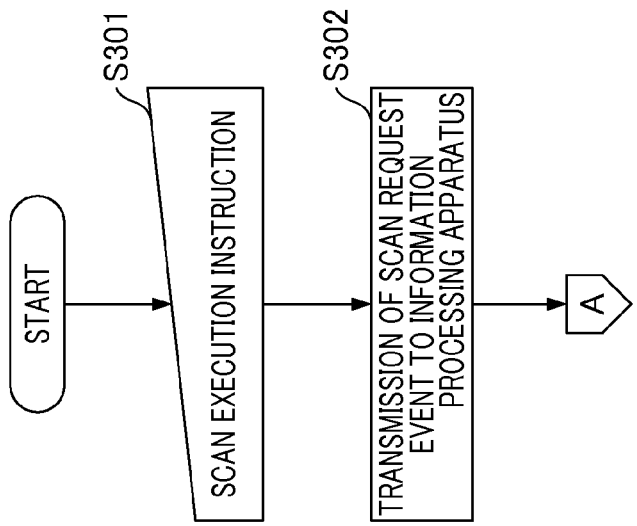
Figure 7:
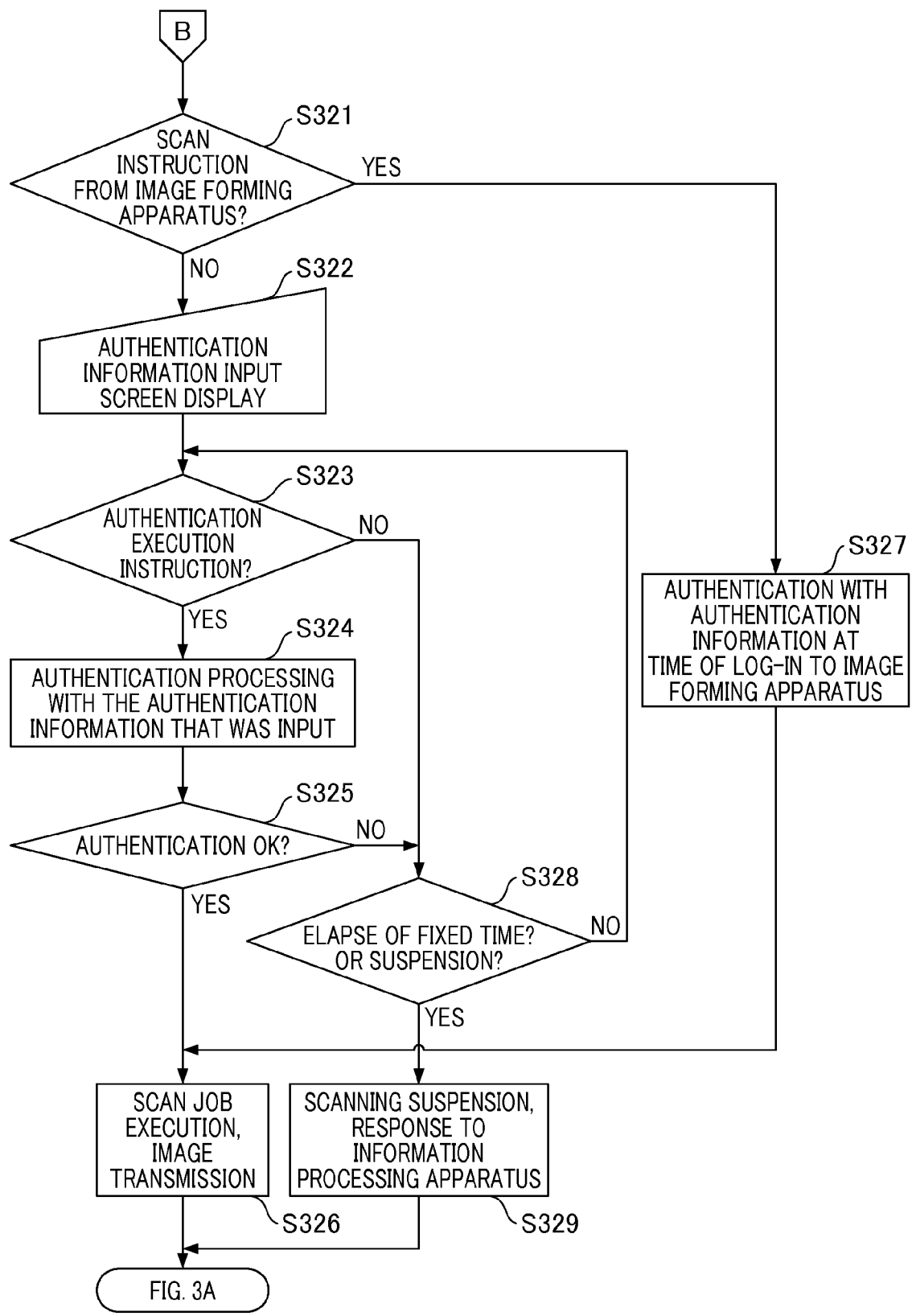
FIG. 7 is a drawing which explains examples of scan execution instruction processing and scan execution processing by an image forming apparatus.

FIG. 6 and FIG. 7 are flowcharts which describe examples of scan execution instruction processing and scan execution processing by an image forming apparatus. FIG. 6A shows an example of scan execution instruction processing by an image forming apparatus. It is assumed that the image forming apparatus 102 has previously acquired and stored the information of the information processing apparatus 101 that is the transmission counterpart of the image data. The image forming apparatus 102 may also register multiple information processing apparatuses 101 as transmission counterparts of image data. Moreover, in the case where an authentication function is enabled in the image forming apparatus 102, it is necessary to conduct authentication according to operations employing the operating unit 149 in order to operate the image forming apparatus 102. Authentication is conducted using authentication information which is input into an authentication screen that is displayed on the operating unit 149. Therefore, processing from step S301 onward is performed after authentication has been conducted using the operating unit 149.

First, in accordance with user manipulation, the operating unit 149 of the image forming apparatus 102 designates an information processing apparatus 101 that is the transmission counterpart to which scanned image data is to be sent, and issues a scan execution instruction (step S301). After the scan execution instruction has been issued, the CPU 141 transmits a scan request event to the information processing apparatus 101 that is the transmission counterpart (step S302). In step S302, the CPU 141 also stores the address information of the information processing apparatus 101 that is the transmission counterpart of the scan request event in a storage unit.

When the information processing apparatus 101 receives the scan request event that was transmitted in step S302, this triggers issuance of a scan execution instruction to the driver 133 (S210 in FIG. 4, and S230 in FIG. 5).

FIG. 6B and FIG. 7 show examples of scan execution processing by an image forming apparatus. As shown in FIG. 6B, first, the CPU 141 of the image forming apparatus 102 discriminates whether a scan request has been received (step S310). A scan request is transmitted from the information processing apparatus 101 in step S211 of FIG. 4(B) and in step S231 of FIG. 5 described above. In the case where the CPU 141 discriminates that a scan request has not been received, the processing returns to step S310.

In the case where the CPU 141 discriminates that a scan request has been received, the CPU 141 discriminates whether an authentication function is enabled in the image forming apparatus 102 (step S311). An authentication function is a function which requests authentication using user information (user ID, password, etc.) managed in the image forming apparatus 102 when the image forming apparatus 102 is to be used. The purpose of the authentication function is to improve the security of the image forming apparatus 102, and manage information tied to user information such as usage history. The user information may be pre-registered in the image forming apparatus 102 by a manager. For example, the user information may be stored in the external memory 160 of the image forming apparatus 102. Also, setting indicating whether the authentication function is enabled or disabled is stored in the external memory. This registration and setting are carried out by a manager who manipulates the operating unit 149 of the image forming apparatus 102. User information may also be retained by an external server. The manager may also conduct registration of user information and setting of the authentication function through the operating unit 119 of the information processing apparatus 101.

In the case where an authentication function is not enabled, the processing advances to step S315. The CPU 141 then executes the scan job so as to subject scan processing to the image, and the image data obtained by the scan processing is transmitted to the driver 133 of the information processing apparatus 101.

In the case where an authentication function is enabled, the CPU 141 functions as a first discrimination unit which executes the following processing. The CPU 141 functions as a first discrimination unit which executes the following processing based on the type of control protocol of the scan request received in the aforementioned step S310. The CPU 141 discriminates whether the control protocol of the scan request can utilize the authentication function of the image forming apparatus 102 (step S312). In the case where the control protocol of the scan request is a control protocol unique to the image forming apparatus 102, the CPU 141 discriminates that the control protocol of the scan request can utilize the authentication function of the image forming apparatus 102. In the case where the control protocol of the scan request is not a control protocol that is unique to the image forming apparatus 102, the CPU 141 discriminates that the control protocol of the scan request cannot utilize the authentication function of the image forming apparatus 102. For example, in the case where the control protocol of the scan request is a general-purpose control protocol, the CPU 141 discriminates that the control protocol of the scan request cannot utilize the authentication function of the image forming apparatus 102. This is because an authentication function unique to the image forming apparatus 102 can only conduct authentication processing with a control protocol that is unique to the image forming apparatus 102.

In the case where the CPU 141 discriminates that the control protocol of the scan request cannot utilize the authentication function of the image forming apparatus 102, the processing advances to step S321 of FIG. 7. In the case where the CPU 141 discriminates that the control protocol of the scan request can utilize the authentication function of the image forming apparatus 102, the processing advances to step S313.

Next, the CPU 141 requests the dedicated driver 133*a* of the information processing apparatus 101 to transmit authentication information, and conducts authentication processing by the control protocol unique to the image forming apparatus 102 using the authentication information received from the dedicated driver 133*a* in response to the pertinent request (step S313).

Next, the CPU 141 discriminates whether the authentication has been successful (step S314). In the case where the authentication has been successful, the processing advances to step S315. The CPU 141 then receives and executes the scan job transmitted from the dedicated driver 133*a* of the information processing apparatus 101. The CPU 141 then controls the scan unit 151 to transmit the scanned image data to the dedicated driver 133*a* (step S315), and processing terminates.

In the case where the authentication failed, the CPU 141 suspends scan processing, and notifies the dedicated driver 133*a* of the information processing apparatus 101 of the error result (step S316).

In step S321 of FIG. 7, the CPU 141 discriminates whether the scan request accepted in step S310 was issued by the information processing apparatus 101 in response to a scan execution request from the image forming apparatus 102 (step S310). In short, the CPU 141 functions as a second discrimination unit which discriminates whether the device driver transmitted a scan command in accordance with a scan processing instruction received from the image forming apparatus 102. As stated above, the image forming apparatus 102 stores the address information of the information processing apparatus 101 that is the transmission counterpart of the scan request event in a storage unit in step S301 of FIG. 6A. Therefore, the CPU 141 discriminates whether the request source of the scan request conforms to the address information in the storage unit.

In the case where the request source of the scan request does not conform to the address information in the storage unit, the CPU 141 discriminates that the scan request was not issued by the information processing apparatus 101 in response to the scan execution instruction from the image forming apparatus 102, and the processing advances to step S322. In the case where issuance of a scan request derives from issuance of a scan execution instruction by activation of the general-purpose driver 133*b* by user manipulation of the operating unit 119 of the information processing apparatus 101, the request source of the scan request does not conform to the address information in the storage unit. Therefore, in this case, the CPU 141 discriminates that the scan request was not issued by the information processing apparatus 101 in response to the scan execution instruction from the image forming apparatus 102.

In step S322, the CPU 141 displays an authentication information input screen in the operating unit 149. An authentication information input screen is a screen for input of authentication information.

Figure 8:
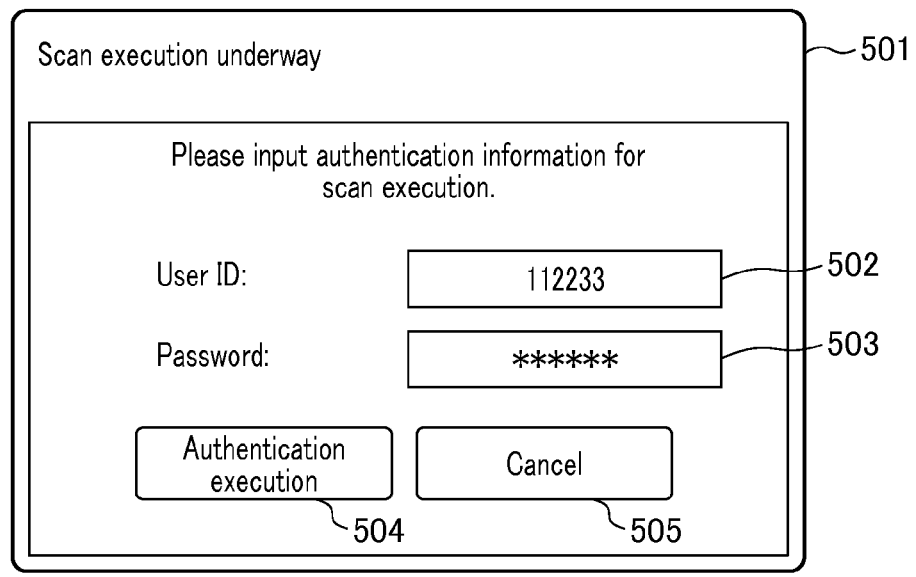
FIG. 8 is a drawing which shows an exemplary authentication information input screen.

FIG. 8 is a drawing which illustrates an exemplary authentication information input screen. An authentication information input screen 501 has a user ID editing box 502 and a password editing box 503. The user ID editing box 502 is an editing box for input of a user ID. The password editing box 503 is an editing box for input of a password.

When the user inputs a user ID into the user ID editing box 502, inputs a password into the password editing box 503, and presses down on an authentication execution button 504, an authentication execution instruction is issued, and the CPU 141 executes the following authentication processing. The CPU 141 discriminates whether the user ID and password that were input conform to the user ID and password that were pre-registered in the image forming apparatus 102. In the case where the user ID and password that were input conform to the user ID and password that were pre-registered in the image forming apparatus 102, the CPU 141 discriminates that authentication has been successful. In the case where the user ID and password that were input do not conform to the user ID and password that were pre-registered in the image forming apparatus 102, the CPU 141 discriminates that authentication has failed.

A cancel button 505 is a button for instructing suspension of authentication. In the case where the cancel button 505 is pressed, the CPU 141 suspends authentication processing, and suspends scan processing.

Returning to FIG. 7, in step S323, the CPU 141 discriminates whether an authentication execution instruction has been issued. In the case where an authentication execution instruction has not been issued, the processing advances to step S328. In the case where an authentication execution instruction has been issued, the CPU 141 executes authentication processing based on the authentication information (user ID and password) that was input into the authentication information input screen (step S324).

Next, the CPU 141 discriminates whether authentication has been successful (step S325). In the case where authentication has failed, the processing advances to step S328. In the case where authentication has been successful, the processing advances to step S326.

In step S326, the CPU 141 executes the scan job that was transmitted from the general-purpose driver 133b of the information processing apparatus 101. That is, the CPU 141 controls the scan unit 151 according to the scan commands contained in the scan job, and executes scan processing of an image. The CPU 141 then transmits the image data obtained by the scan processing to the general-purpose driver 133b of the information processing apparatus 101 (step S326).

In step S328, the CPU 141 discriminates whether a predetermined fixed time has elapsed, or whether processing suspension has been requested (step S328). The manager may set the aforementioned fixed time by manipulating the operating unit 149 of the image forming apparatus 102. A request for processing suspension is issued by a user who presses the cancel button 505 on the authentication information input screen 501.

A request for processing suspension may also be issued by the general-purpose driver 133b of the information processing apparatus 101 in step S236 of FIG. 5. The CPU 141 does not execute the transmitted scan job while a session with the general-purpose driver 133b of the information processing apparatus 101 is maintained in the processing from steps S322 to S325, S328. Therefore, it is discriminated that the general-purpose driver 133b of the information processing apparatus 101 has timed out, and a request for processing suspension is transmitted.

In the case where the predetermined fixed time has not elapsed, and where processing suspension has not been requested, the processing returns to step S323. In the case where the predetermined fixed time has elapsed, or processing suspension has been requested, the processing advances to step S329.

In step S329, the CPU 141 suspends scan processing, and notifies the general-purpose driver 133b of the information processing apparatus 101 of error termination.

In the case where the request source of the scan request conforms to the address information in the storage unit in the aforementioned step S321, the CPU 141 discriminates that a scan request has been issued by the information processing apparatus 101 in response to a scan execution instruction from the image forming apparatus 102, and the processing advances to step S327. Subsequently, the CPU 141 conducts authentication processing based on the authentication information (user ID, password) that was input at the time of user log-in to the image forming apparatus 102 (step S327). A scan execution instruction is issued in accordance with manipulation by a user who has completed log-in to the image forming apparatus 102 (who has been authenticated). Therefore, the image forming apparatus 102 acquired the authentication information that was input by the user at the time of user log-in. Accordingly, the CPU 141 executes authentication processing using the pertinent acquired authentication information.

As a method of authentication processing in the aforementioned step S327, the following methods are conceivable. One is a method in which the CPU 141 displays an authentication information input screen in a state where the user ID that was logged into the image forming apparatus 102 is input into the pertinent authentication information input screen. By this method, authentication processing is executed only with input of a password by the user. The second is a method in which the CPU 141 displays the authentication information input screen 501 in a state where the user ID and password that were logged into the image forming apparatus 101 are both input. By this means, authentication processing is executed even without inputting of a user ID and password by the user. With these methods, there is the advantage that the user information used for authentication can be changed. Note that, it is also acceptable to set in the image forming apparatus 102 which method is to be used to execute authentication processing in S327.

According to the operational processing of the image forming apparatus 102 described with reference to FIG. 6B and FIG. 7, even in the case where a general-purpose device driver cannot conduct authentication with respect to the image forming apparatus 102, scan processing can be executed by conducting authentication in the image forming apparatus 102.

Figure 9A:
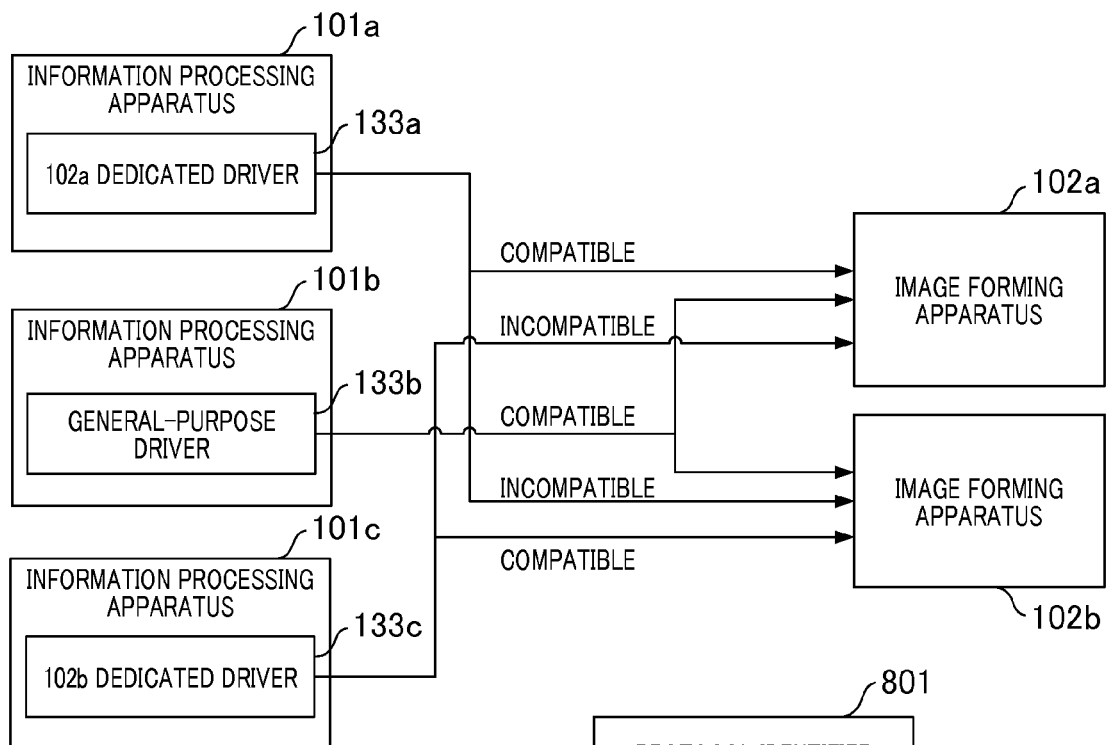
FIG. 9A and FIG. 9B are drawings which explain a correspondence relationship between a driver with which an information processing apparatus is provided and an image forming apparatus.
Figure 9B:
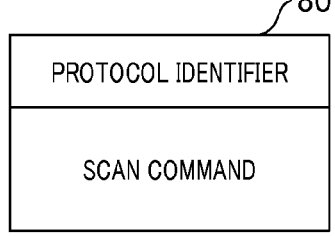

FIG. 9A and FIG. 9B are drawings which describe a correspondence relationship between a driver with which an information processing apparatus is provided and an image forming apparatus. As shown in FIG. 9A, a dedicated driver 133a for an image forming apparatus 102a is installed in an information processing apparatus 101a. A general-purpose driver 133b is installed in an information processing apparatus 101b. A dedicated driver 133c for an image forming apparatus 102b is installed in an information processing apparatus 101c.

The image forming apparatus 102a corresponds to a general-purpose control protocol, and a control protocol unique to the image forming apparatus 102a. The image forming apparatus 102b corresponds to a general-purpose control protocol, and a control protocol unique to the image forming apparatus 102b.

For example, in the case where the company of manufacture of the image forming apparatus 102a and the company of manufacture of the image forming apparatus 102b differ, the image forming apparatus 102a and the image forming apparatus 102b will only correspond to mutually different unique control protocols, as stated above.

FIG. 9B illustrates an exemplary control protocol configuration. A control protocol 801 includes a protocol identifier and a command. The protocol identifier is an identifier which uniquely identifies the control protocol 801. In this example, the command is a scan command which is an instruction for scan processing.

In the case where the CPU 141 of the image forming apparatus 102a receives the control protocol 801, the CPU 141 discriminates which control protocol is the control protocol 801 based on the protocol identifier. In the case where the image forming apparatus 102a discriminates that the control protocol 801 is the control protocol unique to the image forming apparatus 102a, the image forming apparatus 102a is able to understand the control protocol 801. Therefore, the image forming apparatus 102a executes processing in accordance with the commands contained in the control protocol 801. In the case where the image forming apparatus 102a executes processing in accordance with the commands contained in the control protocol 801, the image forming apparatus 102a is able to conduct control unique to the image forming apparatus 102a. Therefore, when unique authentication processing is enabled in the image forming apparatus 102a, such authentication processing can also be conducted.

In the case where the image forming apparatus 102a discriminates that the control protocol 801 is a general-purpose control protocol, the image forming apparatus 102a is able to understand the control protocol 801. Therefore, the image forming apparatus 102a executes processing in accordance with the general-purpose control protocol. The image forming apparatus 102a cannot control conduct control unique to the image forming apparatus 102a with general-purpose control protocol.

In the case where the image forming apparatus 102a discriminates that the control protocol 801 is a control protocol unique to the image forming apparatus 102b, the image forming apparatus 102a cannot understand the control protocol 801. Therefore, processing is not executed in this case.

Second Embodiment

Next, a description is given of an information processing system of second embodiment. The configuration of the information processing system of Second embodiment is identical to the configuration of the information processing system of the first embodiment described with reference to FIG. 1. In the second embodiment, the image forming apparatus 102 has an authentication permission list that was stored in the storage unit (e.g., the external memory 160) in advance, and executes authentication processing using the authentication permission list. An authentication permission list is a list which includes correspondence information relating identification information of the information processing apparatus 101 that the image forming apparatus 102 permits authentication at the time of scan processing and authentication information of the users who are permitted to use the image forming apparatus 102.

Figure 10:
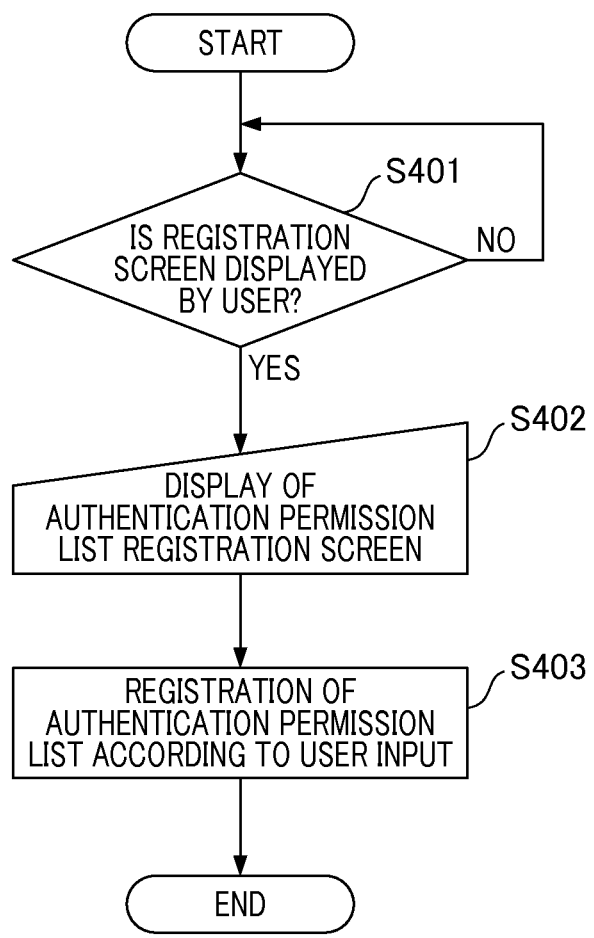
FIG. 10 is a drawing which explains an example of authentication permission list registration processing in an image forming apparatus.

FIG. 10 is a flowchart which describes an example of authentication permission list registration processing in an image forming apparatus. First, the CPU 141 discriminates whether the user has issued an instruction to display an authentication permission list registration screen by manipulation of the operating unit 149 of the image forming apparatus 102. An authentication permission list registration screen is a screen which is used for registering the information processing apparatus 101 in an authentication permission list. In the case where the user has not issued an instruction to display an authentication permission list registration screen, a return to step S401 occurs. In the case where the user has issued an instruction to display an authentication permission list registration screen, the CPU 141 displays an authentication permission list registration screen 601.

Figures 11A, 11B:
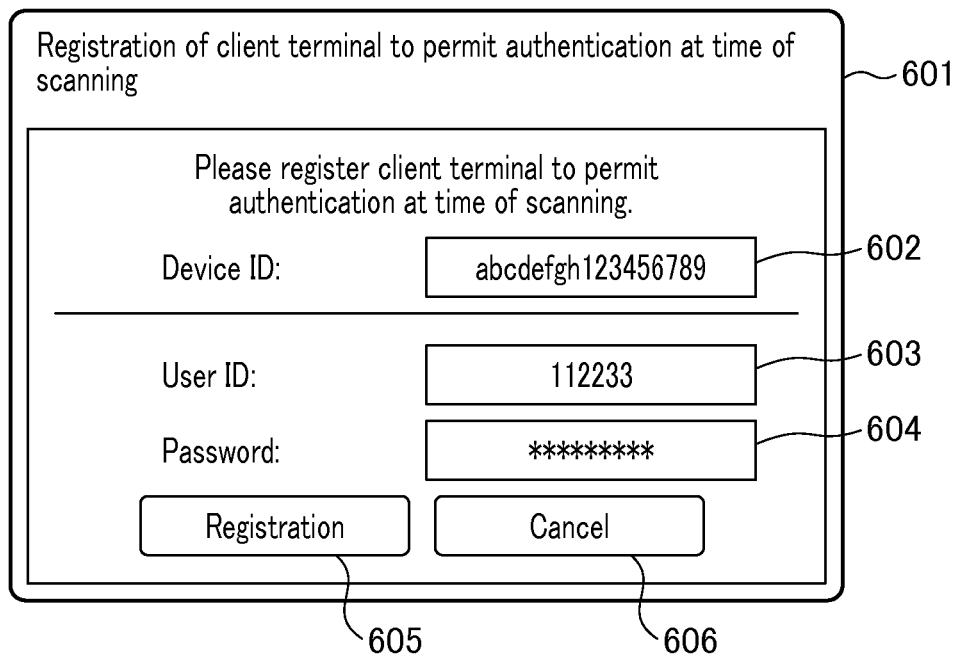
FIG. 11A and FIG. 11B are drawings which illustrate examples of an authentication permission list registration screen and an authentication permission list.

FIG. 11A and FIG. 11B are drawings which illustrate examples of an authentication permission list registration screen and an authentication permission list. FIG. 11A illustrates an example of an authentication permission list registration screen.

A device ID editing box 602 is an editing box for input of a device ID that can uniquely identify the information processing apparatus 101. For example, the user confirms the device ID that is displayed in the display unit 118 by manipulating the operating unit 119 of the information processing apparatus 101, and inputs the confirmed device ID into the device ID editing box 602. It is acceptable to have the information processing apparatus 101 transmit the device ID to the image forming apparatus 102, and the CPU 141 of the image forming apparatus 102 input the received device ID.

A user ID editing box 603 and a password editing box 604 are editing boxes for input of user information (user ID, password) which is registered with linkage to the device ID that was input into the device ID editing box 602. The user information is set in the image forming apparatus 102 in advance by a manager. The user information is the authentication information, and authentication processing is conducted using the pertinent user information.

A registration button 605 is a button for registering the information that was input into the device ID editing box 602, the user ID editing box 603, and the password editing box 604 as an authentication permission list. When the registration button 605 is pressed, the device ID and the user information that were input into the device ID editing box 602, the user ID editing box 603, and the password editing box 604 are registered in the authentication permission list of the external memory 160 of the image forming apparatus 102. A cancel button 606 is a button for canceling registration in the authentication permission list.

Returning to FIG. 10, in step S403, the CPU 141 registers an authentication permission list in accordance with user manipulation of the authentication permission list registration screen 601.

FIG. 11B illustrates an exemplary authentication permission list. The authentication permission list has the data items of device ID, user ID, and password. The device ID is identification information of the information processing apparatus 101 that the image forming apparatus 102 permits authentication at the time of scan processing. The user ID is identification information of the user who is permitted to use the image forming apparatus 102. The password is a password corresponding to the pertinent user.

The user may also conduct registration processing of an authentication permission list by manipulating the display unit 118 and the operating unit 119 of the information processing apparatus 101. For example, the user may connect to a web server of the image forming apparatus 102 using a web browser of the OS 131 of the information processing apparatus 101, and instruct display of the authentication permission list registration screen. The web server of the image forming apparatus 102 generates the authentication permission list registration screen in accordance with the aforementioned instruction, and the web browser of the information processing apparatus 101 displays the authentication permission list registration screen. When the user then manipulates the web browser to input and register the device ID and the user information, registration of the authentication permission list is conducted in the image forming apparatus 102.

Figure 12:
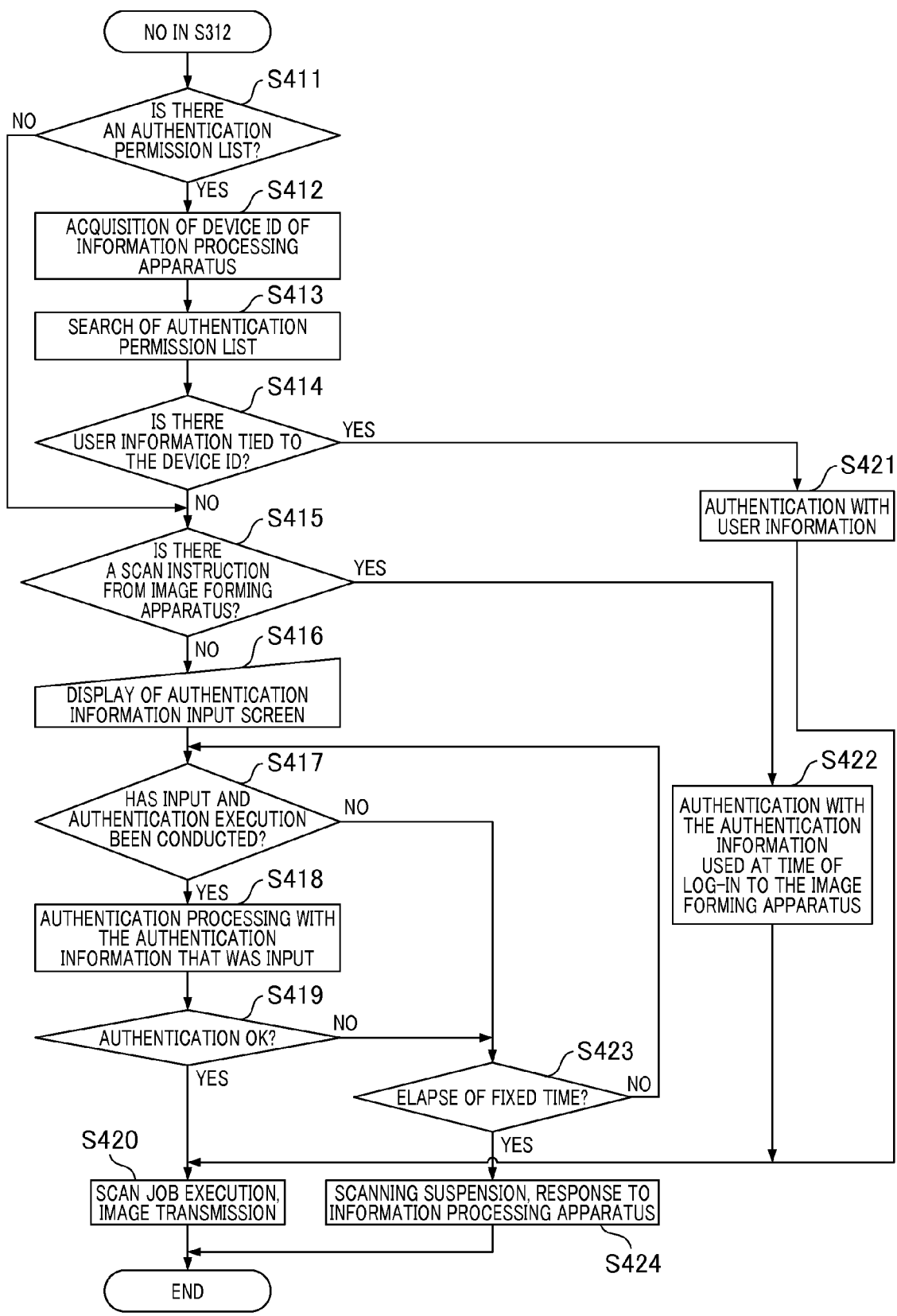
FIG. 12 is a drawing which explains an example of scan execution processing in an image forming apparatus.

FIG. 12 is a flowchart which describes an example of scan execution processing in an image forming apparatus of the second embodiment. The image forming apparatus 102 of the second embodiment executes scan execution processing in the same manner as the scan execution processing described with reference to FIG. 6B.

With respect to the second embodiment, in the case where it is discriminated in step S312 of FIG. 6B that the control protocol of a scan request cannot use the authentication function of the image forming apparatus 102, the processing advances to step S411 of FIG. 10. Note that, steps S415 to S421 of FIG. 12 are identical to steps S321 to S326 of FIG. 7. In addition, steps S422 to S424 of FIG. 12 are identical to steps S327 to S329 of FIG. 7.

In step S411 of FIG. 12, the CPU 141 discriminates whether there is an authentication permission list in the external memory 160 (step S411). In the case where the CPU 141 discriminates that there is no authentication permission list in the external memory 160, the processing advances to step S415. In the case with the CPU 141 discriminates that there is an authentication permission list in the external memory 160, the CPU 41 acquires the device ID which can uniquely identify the information processing apparatus 101 (step S412). In this example, when a scan request is received from the information processing apparatus 101 (step S310 of FIG. 6B), the CPU 141 receives the device ID from the general-purpose driver 133b of the information processing apparatus 101, and stores it in the storage unit. Accordingly, in step S412, the CPU 141 acquires the device ID of the information processing apparatus that is the transmission source of the scan request from the pertinent storage unit.

Next, the CPU 141 functions as a third discrimination means which discriminates whether there is user information tied to the device ID that was acquired in the aforementioned step S412 in the authentication permission list (step S414). In the case where the CPU 141 discriminates that there is no user information tied to the device ID that was acquired in the aforementioned step S412 in the authentication permission list, the processing advances to step S415.

In the case where the CPU 141 discriminates that there is user information tied to the device ID that was acquired in the aforementioned step S412 in the authentication permission list, the processing advances to step S421. The CPU 141 then executes authentication processing based on the user information tied to the device ID acquired in the aforementioned step S412 (step S421). By this means, authentication processing that employs an authentication information input screen is unnecessary, and the labor of inputting authentication information by the user can be omitted.

Note that, as a variation of the present embodiment, it is also acceptable to execute authentication processing using an authentication permission list in step S313 of FIG. 6B.

Third Embodiment

Next, a description will be given of an information processing system in a third embodiment. A configuration of the information processing system in the third embodiment is the same as that of the information processing system in the first embodiment explained with reference to FIG. 1. In the third embodiment, assume that an application 132 is for an authentication application. The authentication application 132 installed into the information processing apparatus 101 communicates with the image forming apparatus 102 to thereby execute authentication processing.

Figure 13:
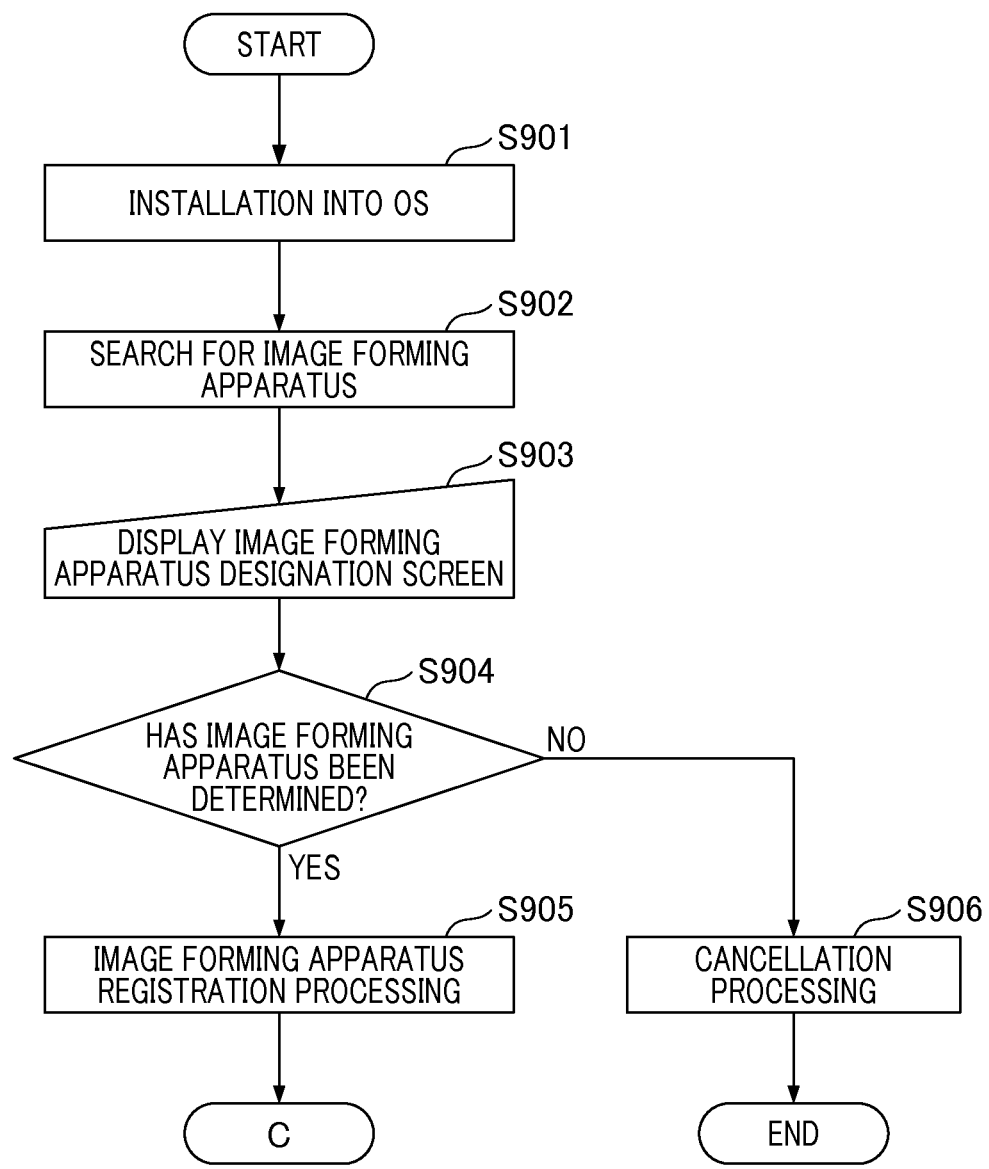
FIG. 13 is a drawing which explains an example of installation processing of an authentication application in an information processing apparatus.

FIG. 13 is a flow chart which explains an example of processing for installing the authentication application 132 in the information processing apparatus 101. In FIG. 13, a description will be given by taking an installation processing by an OS 131 in the information processing apparatus 101 as an example.

Firstly, the information processing apparatus 101 downloads the authentication application 132 from a media such as a CD-ROM or an external server in accordance with a user operation. Then, the information processing apparatus 101 installs the downloaded authentication application 132 into the OS 131 (step S901). Installation is performed by registering files configuring the authentication application 132 and necessary information in the OS 131. In this manner, the authentication application 132 is registered as an application available by the OS 131 of the information processing apparatus 101.

Successively, the authentication application 132 searches for one or more image forming apparatuses that are authentication destinations in step S902. Searching is performed by broadcasting a message including a search protocol to the local network 110, and receiving a response message from an image forming apparatus that has responded to the search protocol. When a plurality of image forming apparatuses responds to the search protocol, it means that the information processing apparatus 101 receives a plurality of response messages. The authentication application 132 analyzes the response message, and generates a list of the one or more image forming apparatus 102 obtained based on the search result.

In step S903, the information processing apparatus 101 displays an authentication destination apparatus selection screen on the display unit 118. The authentication destination apparatus selection screen is a screen for designating an image forming apparatus that is an authentication destination based on the list of the image forming apparatus 102 obtained in step S902.

Figure 18:
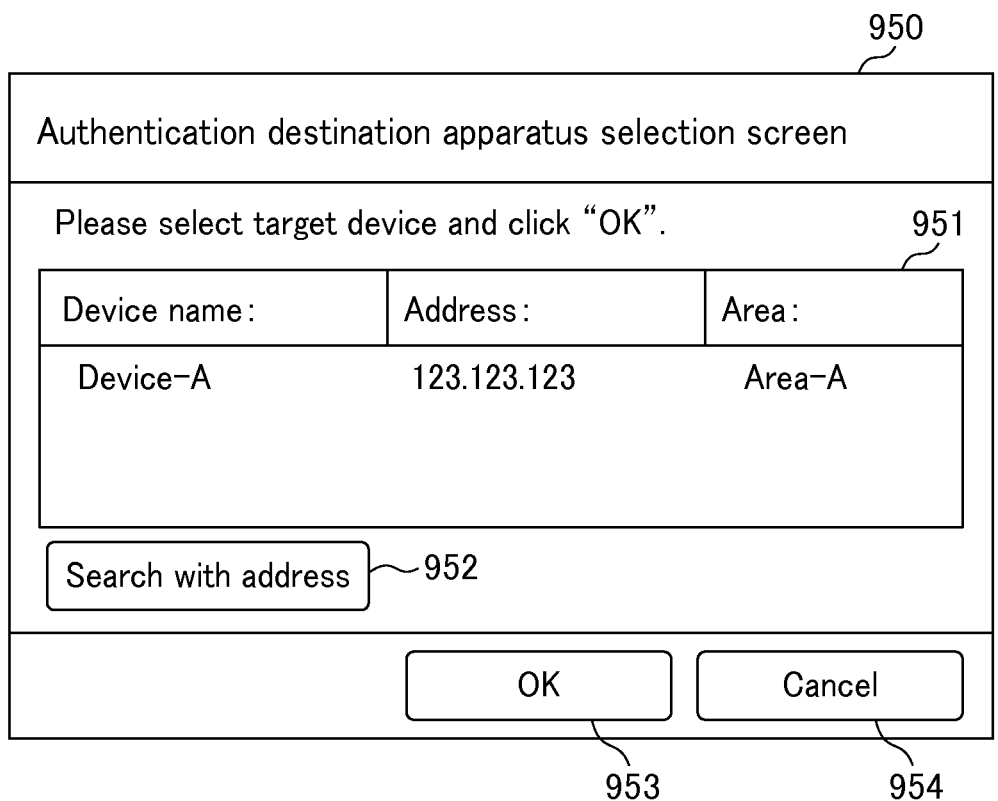
FIG. 18 is a drawing which shows an example of authentication destination apparatus selection screen.

FIG. 18 is a drawing which indicates an example of the authentication destination apparatus selection screen. The authentication destination apparatus selection screen 950 includes an image forming apparatus list 951, an address searching button 952, an OK button 953, and a cancel button 954. The image forming apparatus list 951 is displayed based on the list of the image forming apparatus 102 obtained in step S902, here, an image forming apparatus 102 that is authentication destinations is selected. The image forming apparatus to be selected may be one, or a plurality of image forming apparatuses may be selected. The address searching button 952 is a button for designating the image forming apparatus 102 by manually inputting an address of the image forming apparatus 102. This button is used when no image forming apparatus 102 that is an authentication destination is displayed on the image forming apparatus the list 951. The address to be input may be a host name or may be an IP address of the image forming apparatus 102. An OK button 952 is a button for determining the image forming apparatus 102 that is the authentication destination. Upon pressing of the OK button 952 while the image forming apparatus 102 is selected on the image forming apparatus the list 951, the image forming apparatus 102 that is the authentication destination is determined. A cancel button 954 is a button for cancelling the designation of the image forming apparatus 102.

In step S904, it is determined whether the image forming apparatus 102 of which identification information (that is, an address in this example) of the information processing apparatus is registered has been determined on the authentication destination apparatus selection screen. When the image forming apparatus 102 has been determined (Yes, in step S904), the processing advances to step S905. In other words, the authentication application 132 requests to the image forming apparatus determined in S904 to register the authentication application 132. When the image forming apparatus 102 has not been determined (No, in step S904), the processing advances to step S906.

In step S905, the authentication application 132 stores information such as an address of the designated image forming apparatus 102 in the external memory 130. Then, registration of the authentication application 132 is performed with respect to the image forming apparatus 102. Registration is performed by transmitting a message indicating a registration request from the authentication application 132 to the image forming apparatus 102, and by receiving, by the authentication application 132, a registration result as a response from the image forming apparatus 102. After the registration of the authentication application 132 to the image forming apparatus 102, the processing advances to S920 shown in FIG. 15.

In step S906, the authentication application 132 cancels the designation of the image forming apparatus that is the authentication destination 102, and terminates the processing.

Figure 14:
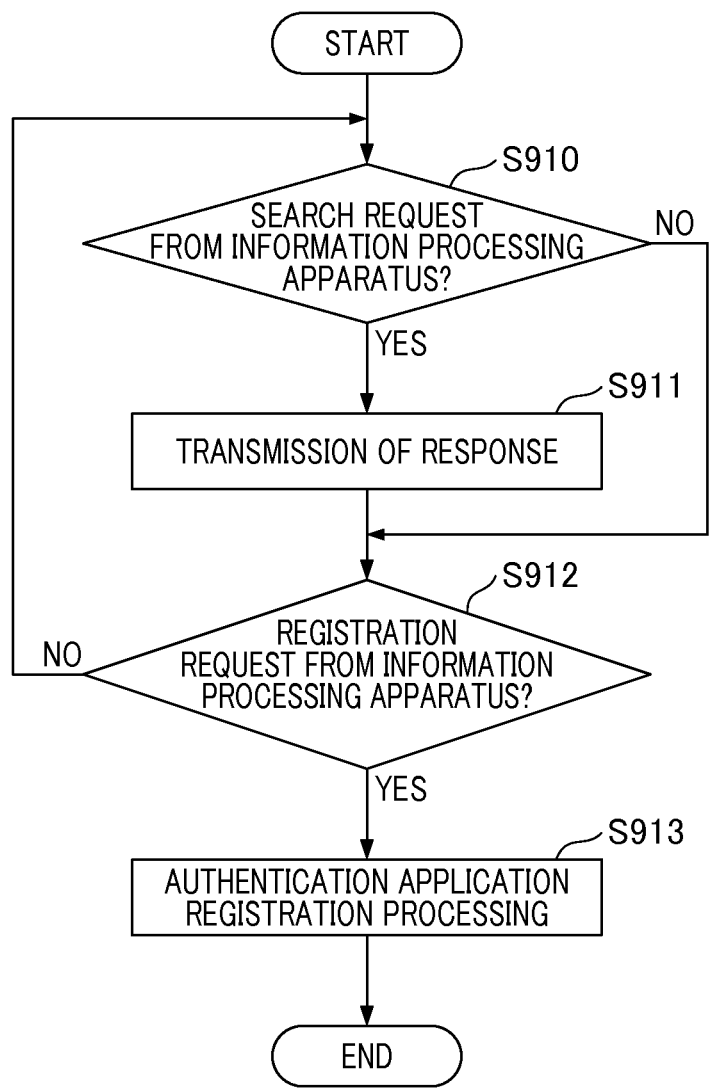
FIG. 14 is a drawing which explains an example of processing in an image forming apparatus when the authentication application is installed in an information processing apparatus.

FIG. 14 is a flow chart which explains an example of processing by the image forming apparatus 102 when the authentication application 132 is installed in the information processing apparatus 101.

Firstly, in step S910, the CPU 141 of the image forming apparatus 102 determines whether a search request has been received from the information processing apparatus 101. The search request is determined based on whether the image forming apparatus 102 has received a message by means of a search protocol corresponding to the image forming apparatus 102 from the information processing apparatus 101 via the local network 110. When the search request has been received (Yes, in step S910), the image forming apparatus 102 notifies the information processing apparatus 101 of a response to the search request in step S911, the processing advances to step S912. When the search request has not been received (No, in step S910), the processing advances to the step S912.

In step S912, the CPU 141 of the image forming apparatus 102, determines whether a registration request of the authentication application 132 is received from the information processing apparatus 101. The registration request is performed by receiving a message indicating the registration request from the information processing apparatus 101 via the local network 110. When the registration request has been received (Yes, in step S912), the processing advances to step S913. When the search request has not been received (No, in step S912), the processing returns to step S910.

In step S913, the CPU 141 performs registration processing of the authentication application 132. Here, the registration processing means that an address of the information processing apparatus 101 on which the authentication application 132 that is a registration request source operates is registered as an authentication destination address in the external memory 160. Then, the CPU 141 notifies the information processing apparatus 101 of a response to the registration request.

Figure 15:
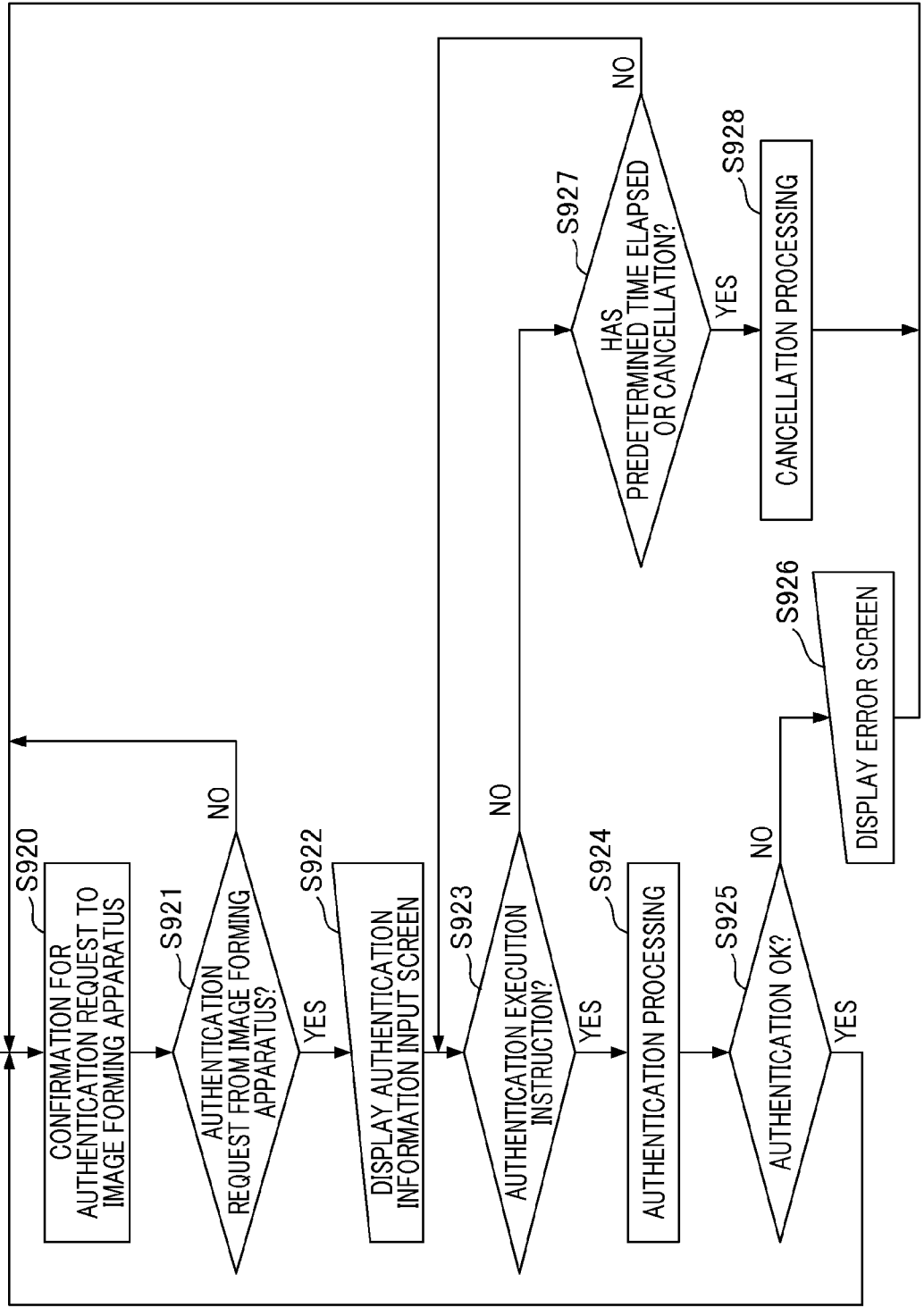
FIG. 15 is a drawing which explains an example of authentication processing of an authentication application in an information processing apparatus.

FIG. 15 is a flow chart which explains an example of processing by the authentication application 132 after the authentication application 132 is installed in the information processing apparatus 101. When an authentication function is valid in the image forming apparatus, the authentication application 132 displays a screen for authentication information on the screen provided in the information processing apparatus, and transmits authentication information input in accordance with an operation on the input screen to the image forming apparatus.

Firstly, in step S920, the authentication application 132 confirms necessity of a authentication request to the image forming apparatus 102. Confirmation of necessity for the authentication request is performed by transmitting a message indicating confirmation for the authentication request to the image forming apparatus 102, and analyzing a response to the conformation.

In step S921, the authentication application 132 determines whether the authentication request has been received from the image forming apparatus 102. When the authentication request has received (Yes, in S921), the processing advances to step S922. When the authentication request has not been received (No, in S921) the processing returns to step S920.

In step S922, the authentication application 132 displays an authentication information input screen on the display unit 118. The authentication information input screen is a screen for inputting authentication information. An example of the authentication information input screen is the same as the authentication information input screen 501 shown in FIG. 8 in the first embodiment.

In step S923, the authentication application 132 determines whether authentication information (a user ID, a password, or the like) has been input, and authentication execution has been instructed on the authentication information input screen. When the authentication execution has been instructed, the processing advances to step S924. When the authentication execution has not been instructed, the processing advances to step S927.

In step S924, the authentication application 132 requests authentication processing to the image forming apparatus 102 based on the authentication information input on the authentication information input screen. The authentication processing is same as that performed in step S213, and is performed by transmitting the authentication information to the image forming apparatus 102. In other words, the authentication application 132 functions as an authentication unit that transmits authentication information so as to instruct authentication processing.

In step S925, the authentication application 132 determines whether the authentication processing has been successful. This determination is performed by analyzing a response including an authentication processing result from the image forming apparatus 102. When the authentication processing has been successful, (Yes, in step S925), the processing returns to step S920. When the authentication processing has failed (No, in step S925), the processing advances to step S926.

In step S926, the authentication application 132 displays the fact that the authentication has failed on the display unit 118 as a message. Then, the processing returns to step S920.

In step S927, the authentication application 132 determines whether a predetermined time has been elapsed or a cancellation of the processing has been requested. The cancellation request of the processing is performed by executing a cancellation on the authentication information input screen. When the predetermined time has been elapsed or the cancellation of the processing has been requested (Yes, in step S927), the processing advances to step S928. When the predetermined time has not been elapsed and the cancellation of the processing has not been requested, the processing returns to step S923.

In step S928, the authentication application 132 cancels the authentication processing, the processing returns to step S920.

Figure 16:
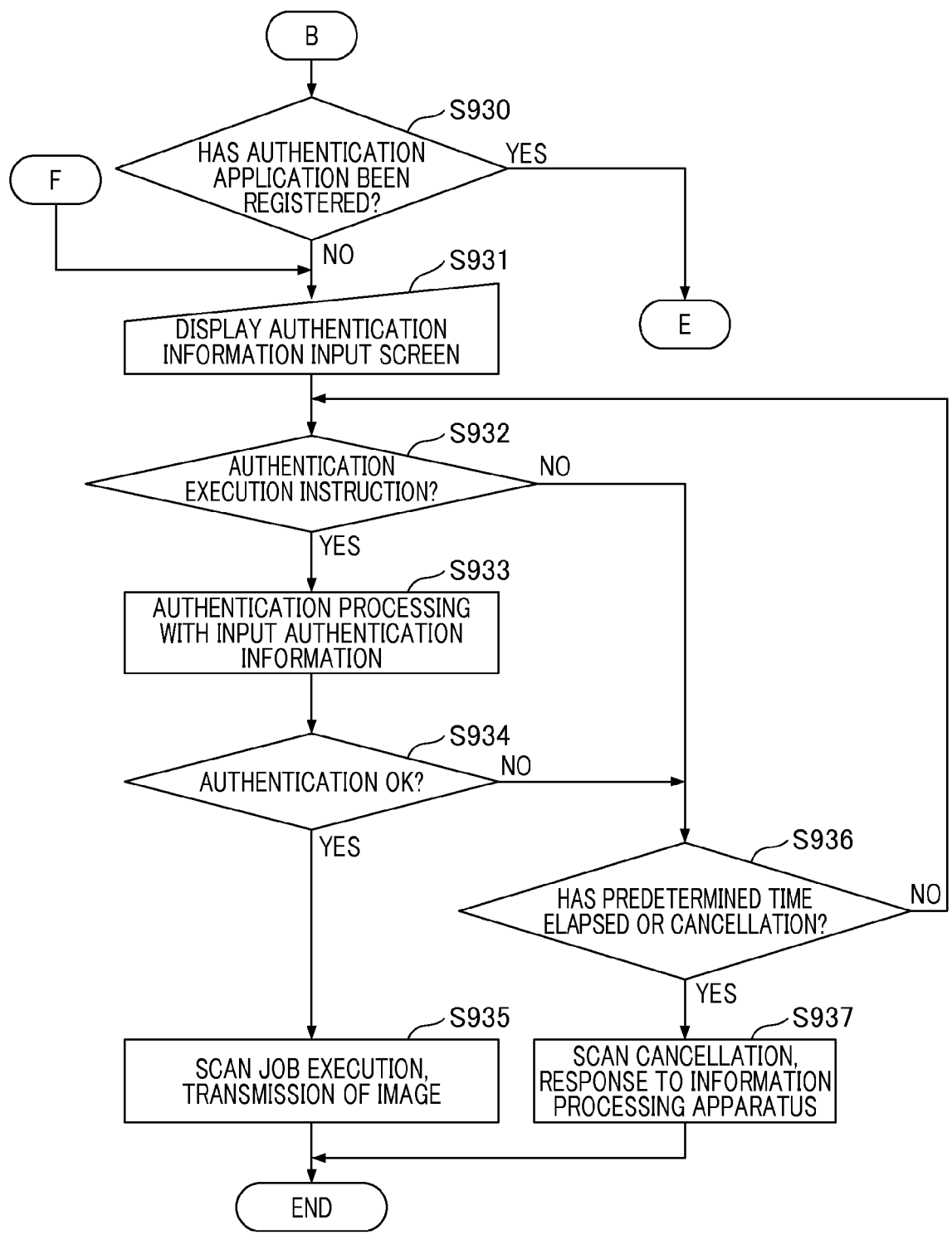
FIG. 16 is a drawing which explains an example of scan execution processing in an image forming apparatus.
Figure 17:
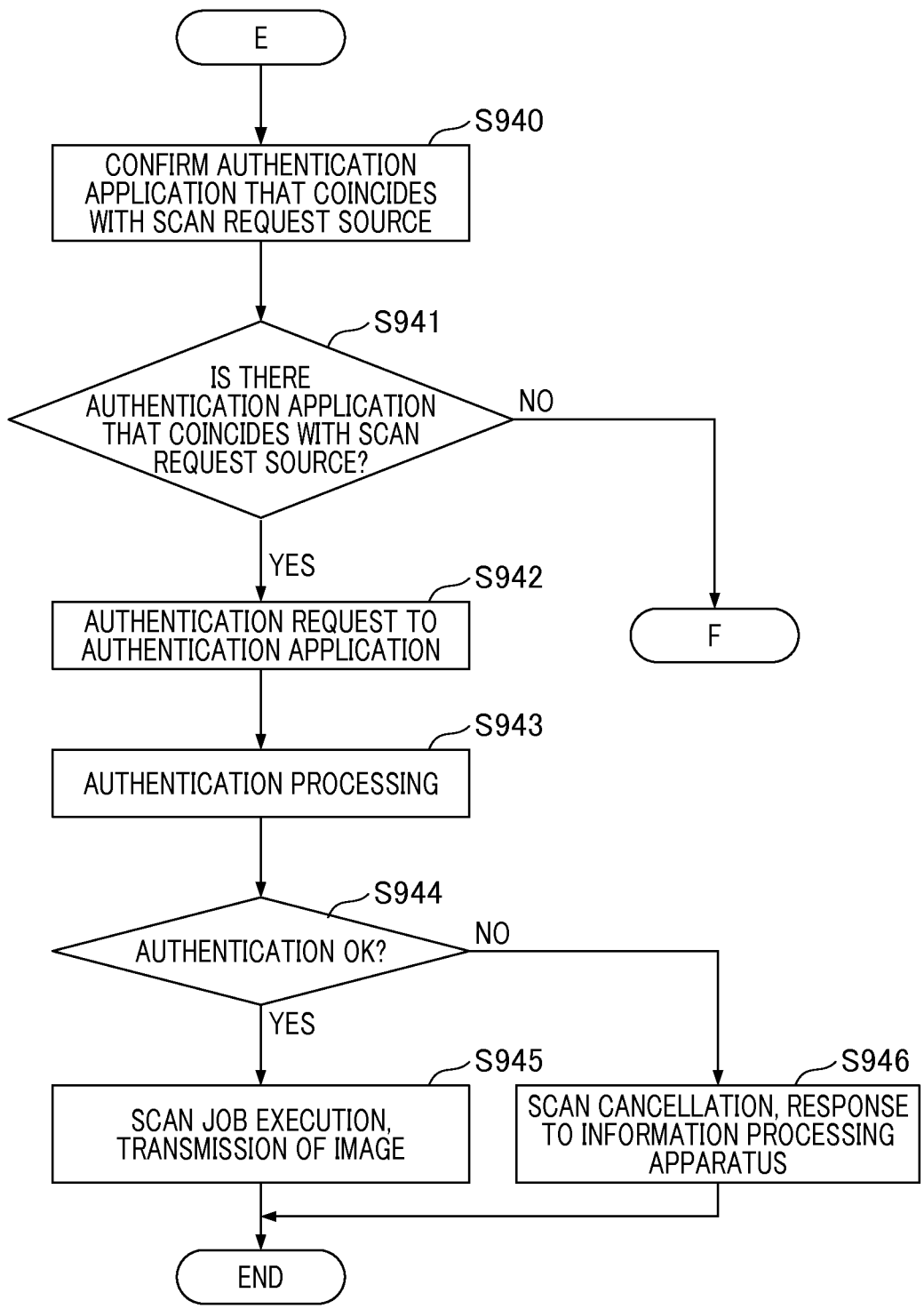
FIG. 17 is a drawing which explains an example of scan execution processing in an image processing

FIG. 16 and FIG. 17 are a flow chart which explains an example of scan execution processing by the image forming apparatus 102 in the third embodiment. The image forming apparatus 102 in the third embodiment executes the scan execution processing that is the same as that described with reference to FIG. 6B.

In the third embodiment, in step S312 shown in FIG. 6B, when it is determined that the control protocol for the scan request cannot utilize the authentication function of the image forming apparatus 102, the processing advances to step S930 shown in FIG. 16. Steps S931 to S937 shown FIG. 16 are the same as those in steps S322 to S326 and steps S328 to S329 shown in FIG. 17.

In step S930 shown in FIG. 16, the CPU 141 of the image forming apparatus 102 determines whether the authentication application 132 is registered. When the registration processing of the authentication application 132 has been performed in step S913, the image forming apparatus 102 determines that the authentication application 132 is registered. When the image forming apparatus 102 determines that the authentication application 132 is registered (Yes, in step S930), the processing advances to step S940 shown in FIG. 17. When the image forming apparatus 102 determines that the authentication application 132 is not registered (No, in step S930), the processing advances to step S931.

In step S940 shown in FIG. 17, the CPU 141 of the image forming apparatus 102 performs the following processing. In other words, the CPU 141 compares the address of the information processing apparatus 101 on which the general-purpose driver 133b that requests the scan in step S310 operates with the authentication destination address that is stored in the external memory 160 in step S913. The authentication destination address stored in the external memory 160 is the address of the information processing apparatus 101 on which the authentication application 132 operates.

In step S941, the CPU 141 of the image forming apparatus 102 determines, based on the comparison result in step S940, whether there is the authentication destination address that coincides with the information processing apparatus 101 on which the general-purpose driver 133b that requests the scan in step S310 operates. When there is the authentication destination address that coincides with the information processing apparatus 101 (Yes, in step S941), the processing advances to step S942. When there is no authentication destination address that coincides with the information processing apparatus 101 (No, in step S941), the processing advances to step S931.

In step S942, the CPU 141 of the image forming apparatus 102 requests an authentication to the coincided authentication destination address. The authentication request is performed by notifying of a response indicating an authentication request with respect to the message indicating the confirmation for the authentication request transmitted from the coincided authentication destination address (step S920). That is to say, upon receipt of the scan command from the general-purpose driver 133b, the CPU 141 instructs the authentication to the information processing apparatus if identification information corresponding to identification information of the information processing apparatus that has transmitted the scan command.

In step S943, the CPU 141 of the image forming apparatus 102 performs the authentication processing in response to the authentication processing by the authentication application 132 that has responded to the authentication request in step S942. The authentication processing is performed by the control protocol specific to the image forming apparatus 102 using the authentication information that has received from the authentication application 132.

In step S944, the CPU 141 determines whether the authentication has been successful. When the authentication has been successful (Yes, in step S944), the processing advances to step S945. When the authentication has failed, the processing advances to step S946.

In step S945, the CPU 141 of the image forming apparatus 102 notifies the fact that the authentication has been successful as a response of the authentication processing to the authentication application 132, and receives and executes a scan job that is transmitted from the general-purpose driver 133b of the information processing apparatus 101. Then, the CPU 141 transmits image data that has been scanned by controlling the scan unit 151 to the general-purpose driver 133b, whereby the processing terminates.

In step S946, the CPU 141 of the image forming apparatus 102 notifies the fact that the authentication has failed as a response of the authentication processing to the authentication application 132. Then the CPU 141 cancels the scan processing and notifies the general-purpose driver 133b of the information processing apparatus 101 of a response indicating an error, whereby the processing terminates.

In the present embodiment, the search and designation of the authentication destination apparatus (steps S902 to S906) are performed upon installation of the authentication application 132. Alternatively, an embodiment in which the OS 131 activates the authentication application 132 and performs the search and designation after installation of the authentication application 132 may be applied.

The first, second and third embodiments described above do not limit the invention pertaining to the claims, nor are all combinations of the features described in the embodiments indispensable to the means of solution of the invention. For example, a WSD scan driver was cited as an example of a general-purpose driver in the foregoing embodiments, but other general-purpose drivers are also acceptable. Moreover, the foregoing first to third embodiments may be appropriately combined. For example, it is also acceptable to have the user set an operational mode by selecting in advance whether the image forming apparatus is to operate as the first embodiment or is to operate as the second embodiment.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2012-144547 filed Jun. 27, 2012, and Japanese Patent Application No. 2013-118734 filed Jun. 5, 2013, which are hereby incorporated by reference herein in their entirety.

What is claimed is:

1. An image reading apparatus which executes image reading processing in accordance with a control command transmitted from a device driver with which an information processing apparatus is provided, the image reading apparatus comprising:
a receiving unit configured to receive a scan command from the device driver;
a first determination unit configured to determine whether a control protocol of the scan command can send authentication information for authenticating by an authentication function when the authentication function is enabled in the image reading apparatus;

a second determination unit configured to determine whether the device driver has transmitted the scan command in accordance with an instruction for scan processing received from the image reading apparatus;

a display unit configured to display an authentication information input screen when it is determined by the first determination unit that the control protocol of the scan command cannot send the authentication information and it is determined by the second determination unit that the device driver has not transmitted the scan command in accordance with an instruction for scan processing received from the image reading apparatus; and an execution unit configured to conduct authentication processing using authentication information that is input in accordance with manipulation of the input screen and to execute scan processing of an image according to the scan command when authentication is successful.

2. The image reading apparatus according to claim 1, wherein the execution unit executes authentication processing using authentication information already authenticated in the image reading apparatus when it is determined by the first determination unit that the control protocol of the scan command cannot send the authentication information and it is determined by the second discrimination unit that the device driver has transmitted the scan command in accordance with the instruction for scan processing received from the image reading apparatus and executes scan processing of an image in accordance with the scan command when authentication is successful.

3. The image reading apparatus according to claim 1, further comprising:

a registration unit configured to register correspondence information for identification information of the information processing apparatus and authentication information in a storage unit; and a third determination unit configured to acquire identification information of the information processing apparatus that is the scan command transmission source and to determine whether authentication information corresponding to the acquired identification information is registered in the storage unit, wherein the execution unit executes authentication processing using authentication information corresponding to the acquired identification information that is in a list registered in the storage unit when it is determined by the first determination unit that the control protocol of the scan command cannot send the authentication information and it is determined by the third discrimination unit that authentication information corresponding to the acquired identification information is registered in the storage unit and executes scan processing of the image in accordance with the scan command when authentication is successful.

4. The image reading apparatus according to claim 1, further comprising a suspension unit configured to determine whether a predetermined time has elapsed when authentication by the authentication processing using authentication information that was input according to manipulation of the input screen fails and to suspend scan processing of the image according to the scan command when it is determined that the predetermined time has elapsed.

5. The image reading apparatus according to claim 1, wherein the execution unit requests the device driver to transmit authentication information and executes authentication processing using authentication information received from the device driver in response to the request, when it is determined that the control protocol of the scan command can utilize the authentication function, and executes scan processing of an image in accordance with the scan command when authentication is successful.

6. The image reading apparatus according to claim 1, wherein the first determination unit determines whether the control protocol of the scan command is a control protocol that depends on the image reading apparatus or is a control protocol that does not depend on the image reading apparatus.

7. The image reading apparatus according to claim 6, wherein the control protocol that does not depend on the image reading apparatus is a Web Services for Devices protocol.

8. The image reading apparatus according to claim 1, further comprising a transmitting unit configured to transmit image data obtained by the scan processing executed by the execution unit.

9. The image reading apparatus according to claim 1, further comprising a setting unit configured to set whether or not the authentication function is enabled.

10. The image reading apparatus according to claim 1, further comprising:

an accepting unit configured to accept a scan execution request by a user; and a requesting unit configured to transmit a scan processing request to the information apparatus based on the scan execution request accepted by the accepting unit, wherein the second determination unit determines whether address information of the transmission source of the scan command conforms to address information of the transmission counterpart of the scan processing request of the scan command.

11. A system which is provided with an information processing apparatus and an image reading apparatus that executes image reading processing in accordance with a control command from the information processing apparatus, wherein the information processing apparatus comprises:
a device driver configured to transmit a scan command to the image reading apparatus, and wherein the image reading apparatus comprises:
a receiving unit configured to receive the scan command from the device driver;

a first determination unit configured to determine whether a control protocol of the scan command can send authentication information for authenticating by an authentication function when the authentication function is enabled in the image reading apparatus;

a second determination unit configured to determine whether the device driver has transmitted the scan command in accordance with an instruction for scan processing received from the image reading apparatus;

a display unit configured to display an authentication information input screen when it is determined by the first determination unit that the control protocol of the scan command cannot send the authentication information and it is determined by the second determination unit that the device driver has not transmitted the scan command in accordance with an instruction for scan processing received from the image reading apparatus; and an execution unit configured to conduct authentication processing using authentication information that is input in accordance with manipulation of the input screen and to execute scan processing of an image according to the scan command when authentication is successful.

12. The system according to claim 11, wherein the information processing apparatus further comprises:

an authentication unit configured to transmit authentication information to the image reading apparatus so as to instruct an authentication processing;
a registration request unit configured to request a registration of the authentication unit to the image reading apparatus, wherein the image reading apparatus further comprises:
a registration unit configured to register the authentication unit upon receiving the request from the registration request unit;
an instruction unit configured to instruct the authentication processing to the authentication unit of the information processing apparatus when it is determined that the authentication information cannot be sent by means of the scan command and when the authentication unit provided in the information processing apparatus that is a source of the scan command is registered,
wherein the execution unit performs the authentication processing using the authentication information transmitted by the authentication unit that has responded to the request from the instruction unit, and
wherein, when the authentication unit provided in the information processing apparatus that is the source of the scan command is not registered, the display unit displays the input screen for the authentication information on the screen of the image reading apparatus.

13. A method for controlling an image reading apparatus which executes image reading processing in accordance with a control command transmitted from a device driver with which an information processing apparatus is provided, the method comprising:
receiving a scan command from the device driver;
determining whether a control protocol of the scan command can send authentication information for authenticating by an authentication function when the authentication function is enabled in the image reading apparatus;
determining whether the device driver has transmitted the scan command in accordance with an instruction for scan processing received from the image reading apparatus;
displaying an authentication information input screen when it is determined that the control protocol of the scan command cannot send the authentication information and it is determined that the device driver has not transmitted the scan command in accordance with an instruction for scan processing received from the image reading apparatus; and
performing authentication processing using authentication information that was input according to manipulation of the input screen and executing scan processing of an image in accordance with the scan command when authentication is successful.

14. A non-transitory storage medium on which is stored a computer program for making a computer execute a method for controlling an image reading apparatus that executes image reading processing in accordance with a control command transmitted from a device driver with which an information processing apparatus is provided, the method comprising:
receiving a scan command from the device driver;
determining whether a control protocol of the scan command can send authentication information for authenticating by an authentication function when the authentication function is enabled in the image reading apparatus;
determining whether the device driver has transmitted the scan command in accordance with an instruction for scan processing received from the image reading apparatus;
displaying an authentication information input screen when it is determined that the control protocol of the scan command cannot send the authentication information and it is determined that the device driver has not transmitted the scan command in accordance with an instruction for scan processing received from the image reading apparatus; and
performing authentication processing using authentication information that was input according to manipulation of the input screen and executing scan processing of an image in accordance with the scan command when authentication is successful.

* * * * *